Patented Sept. 12, 1939

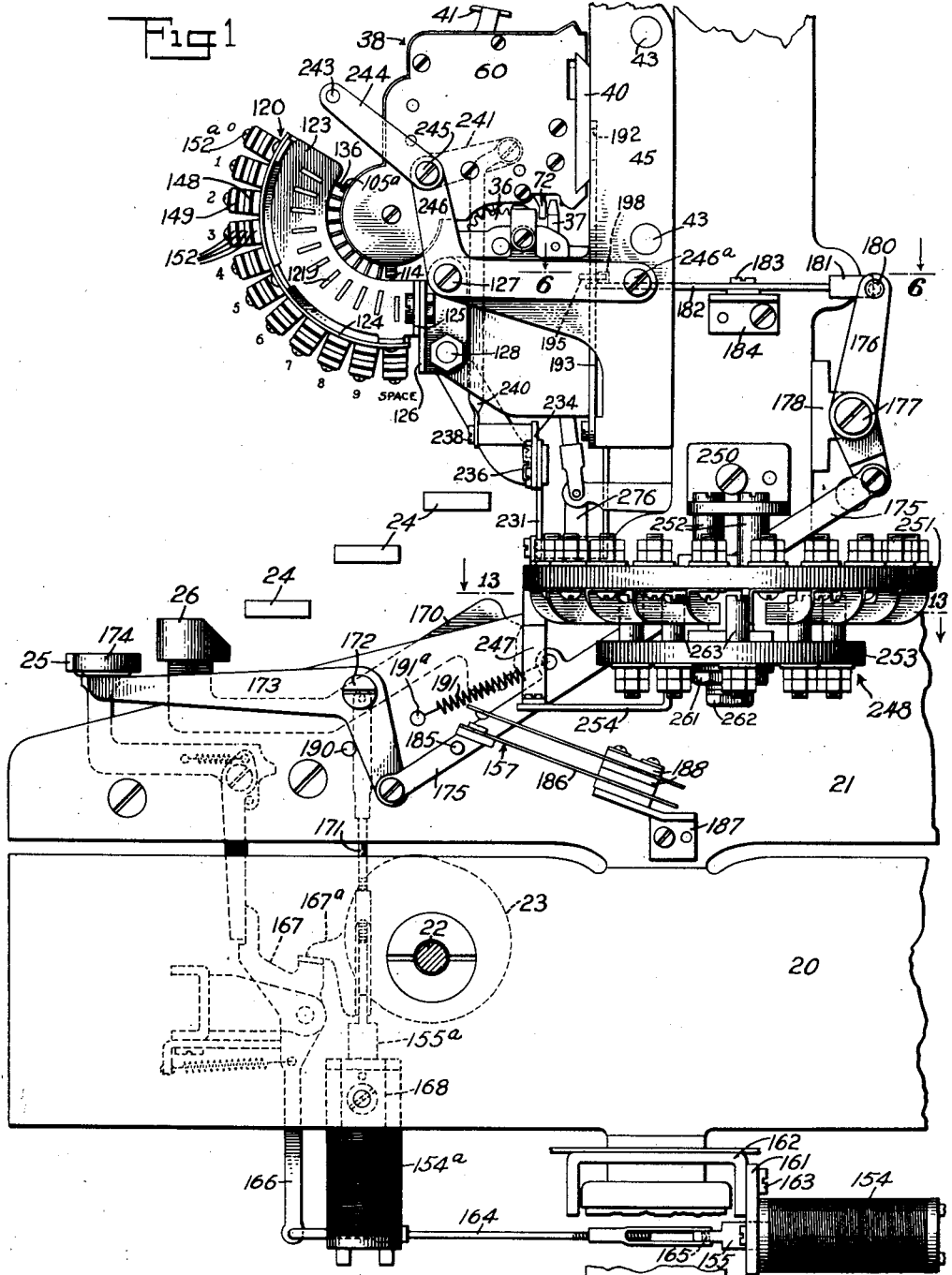

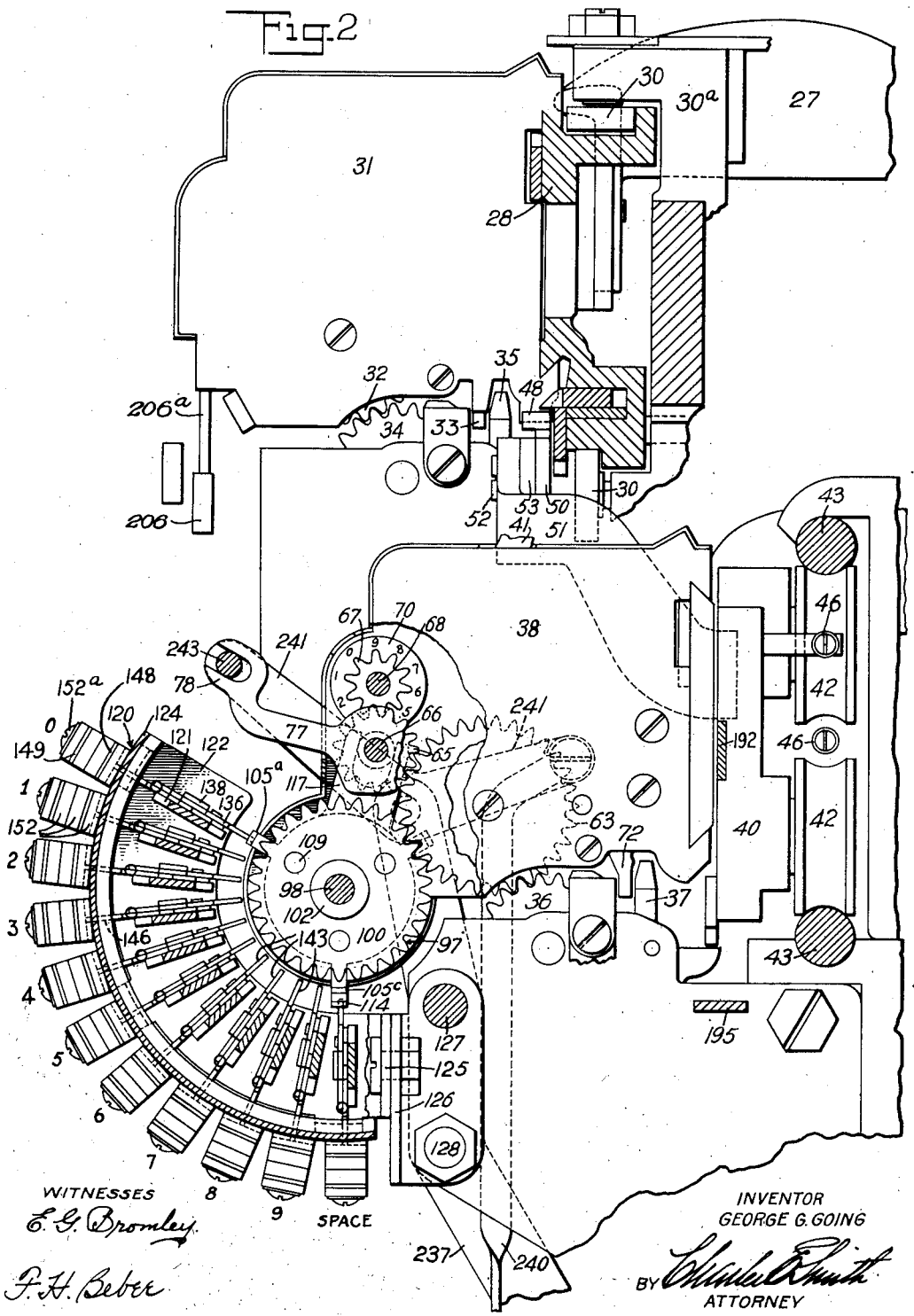

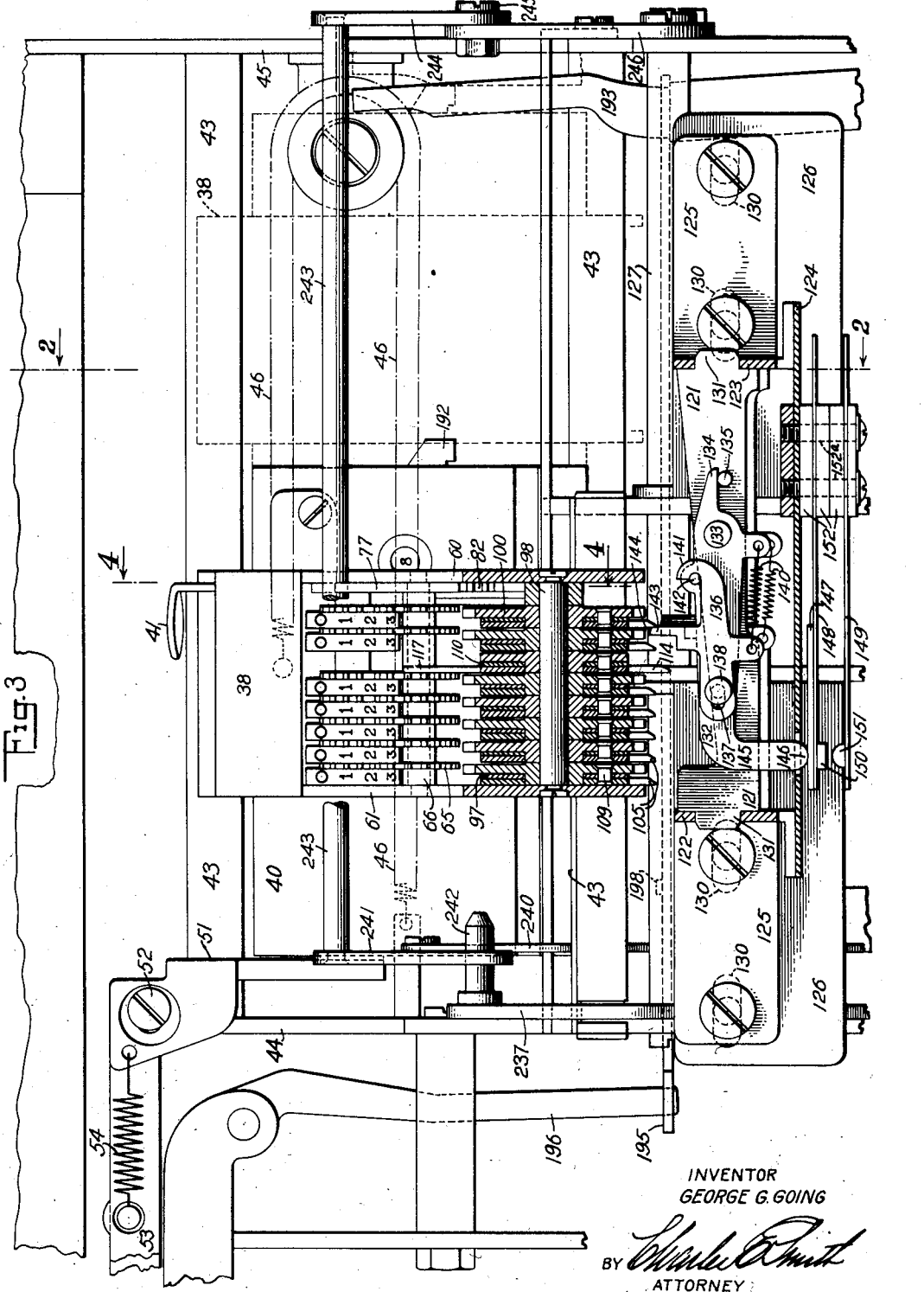

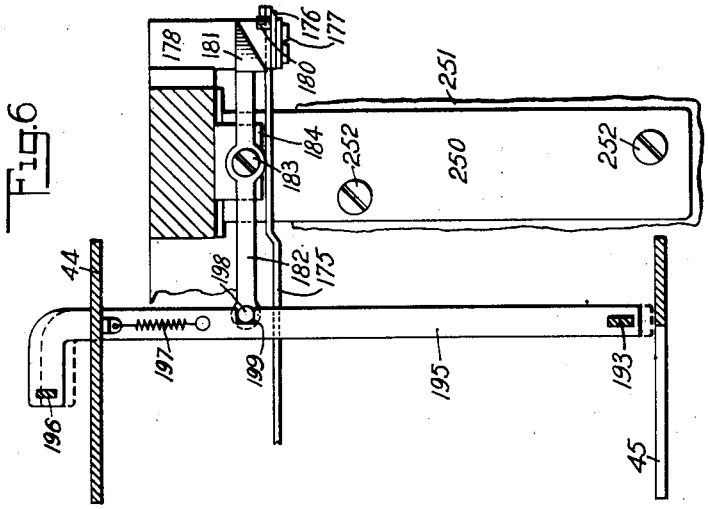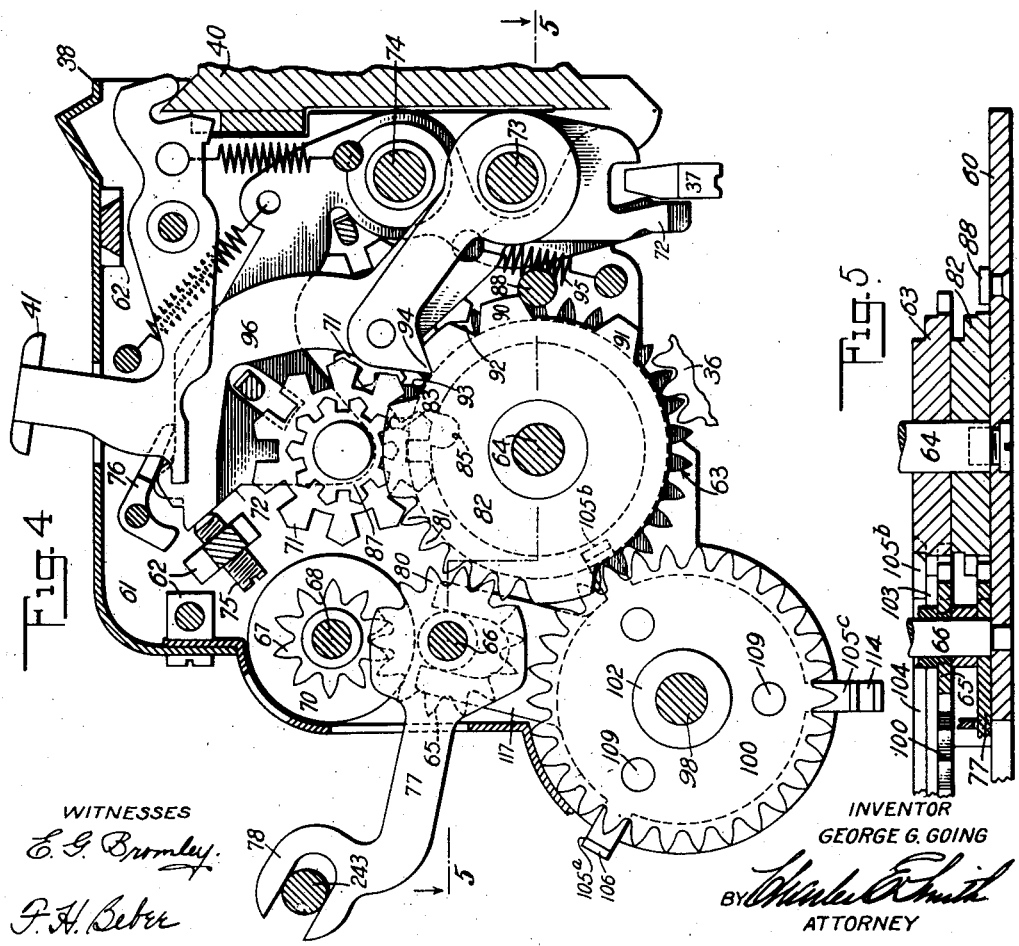

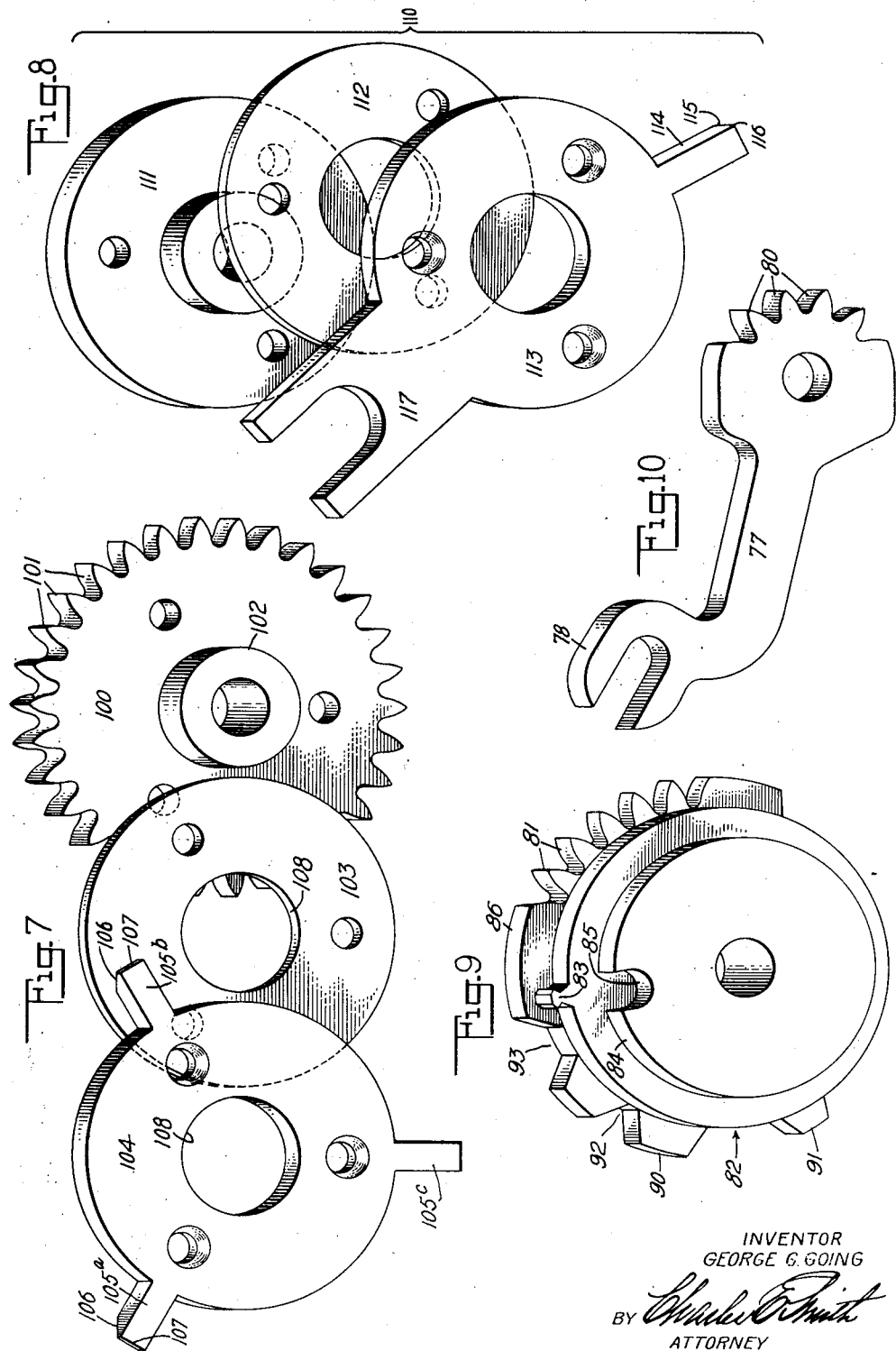

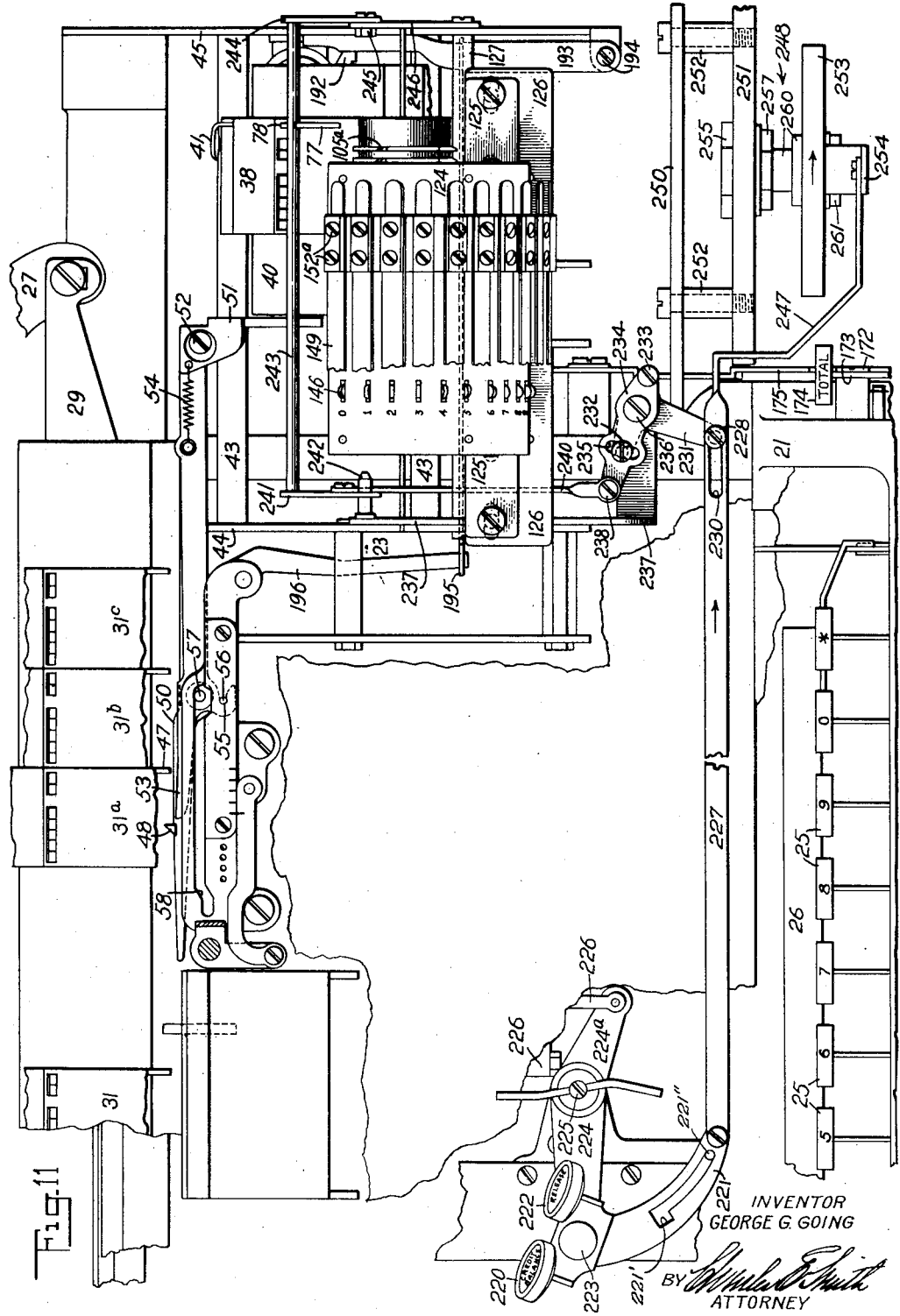

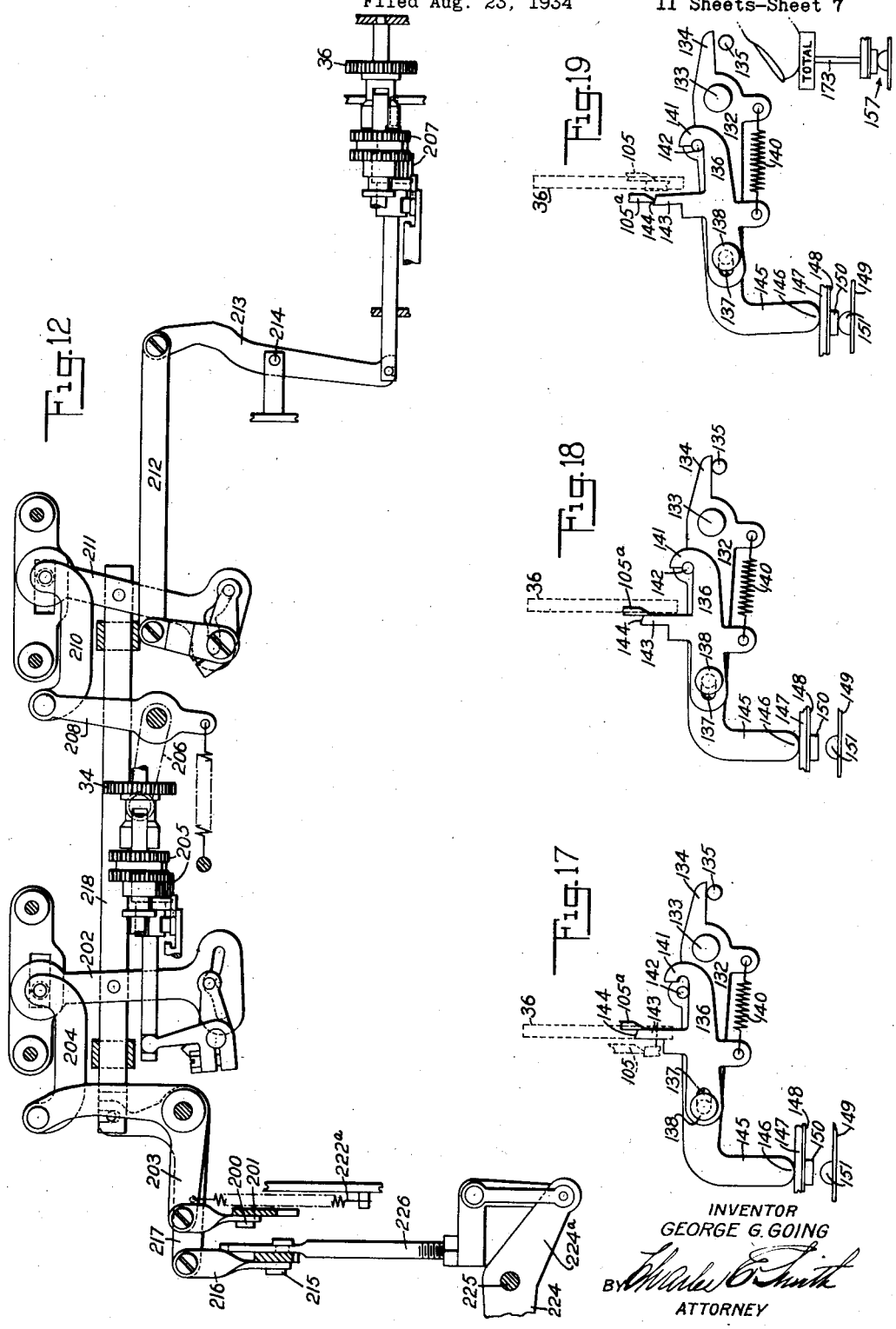

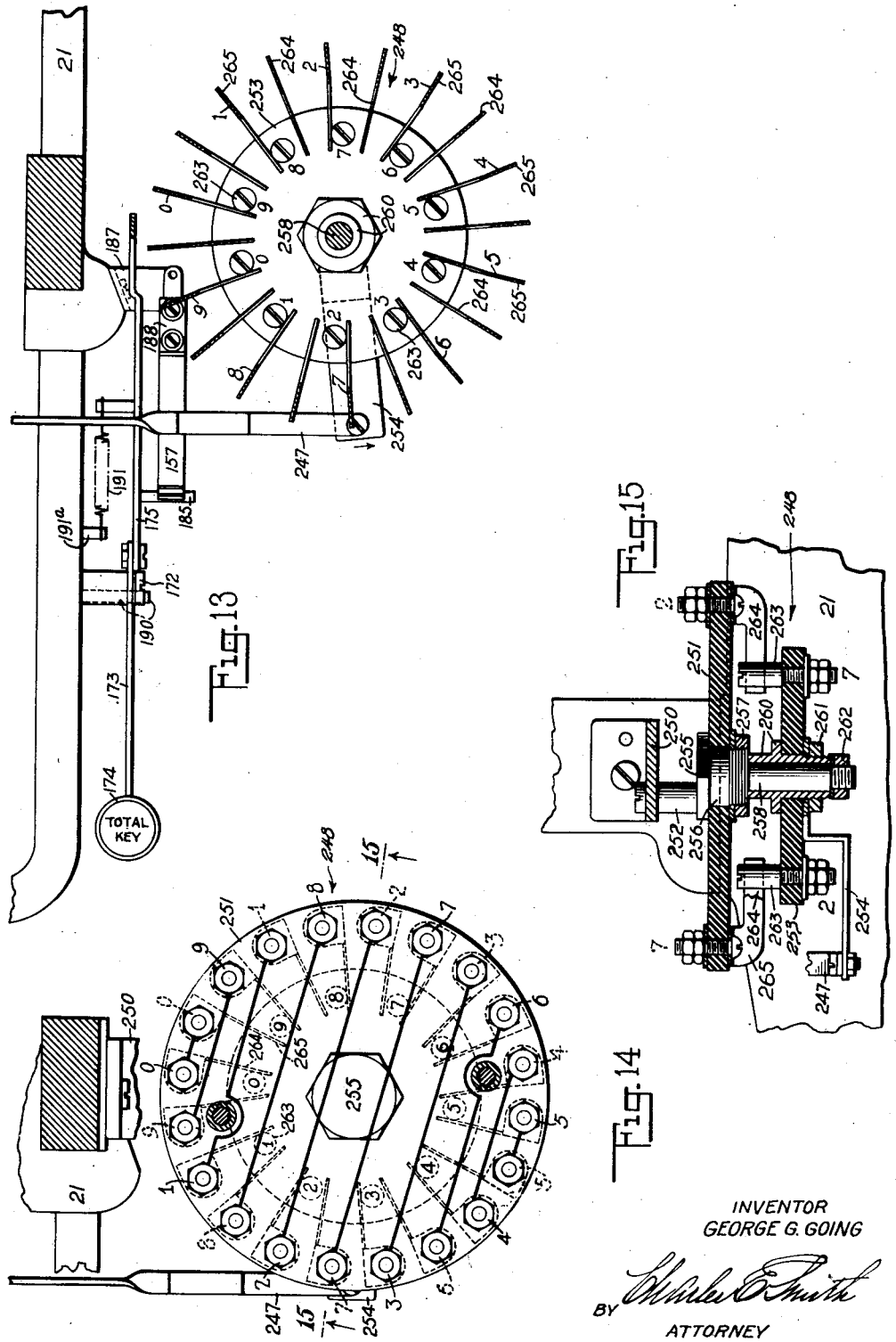

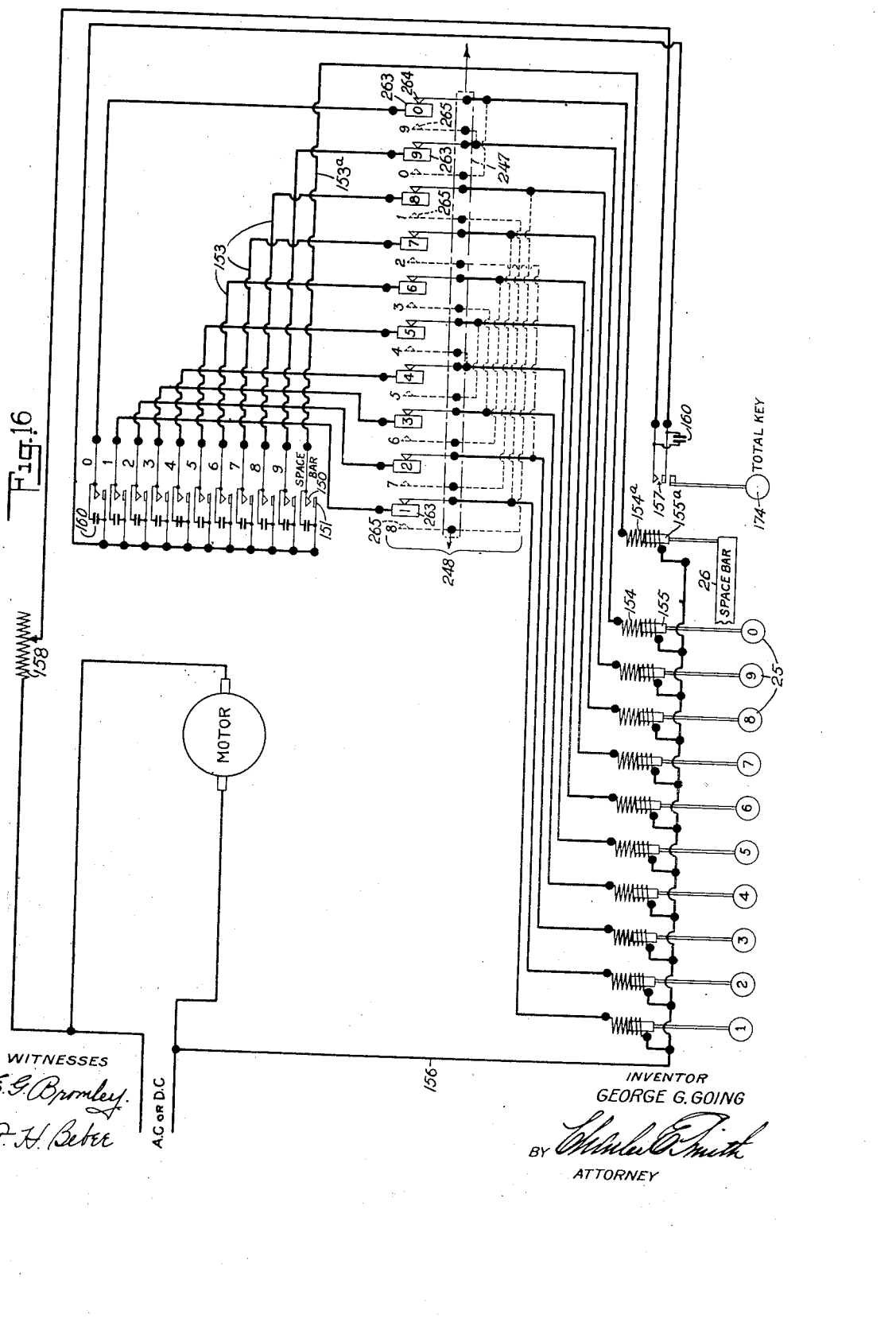

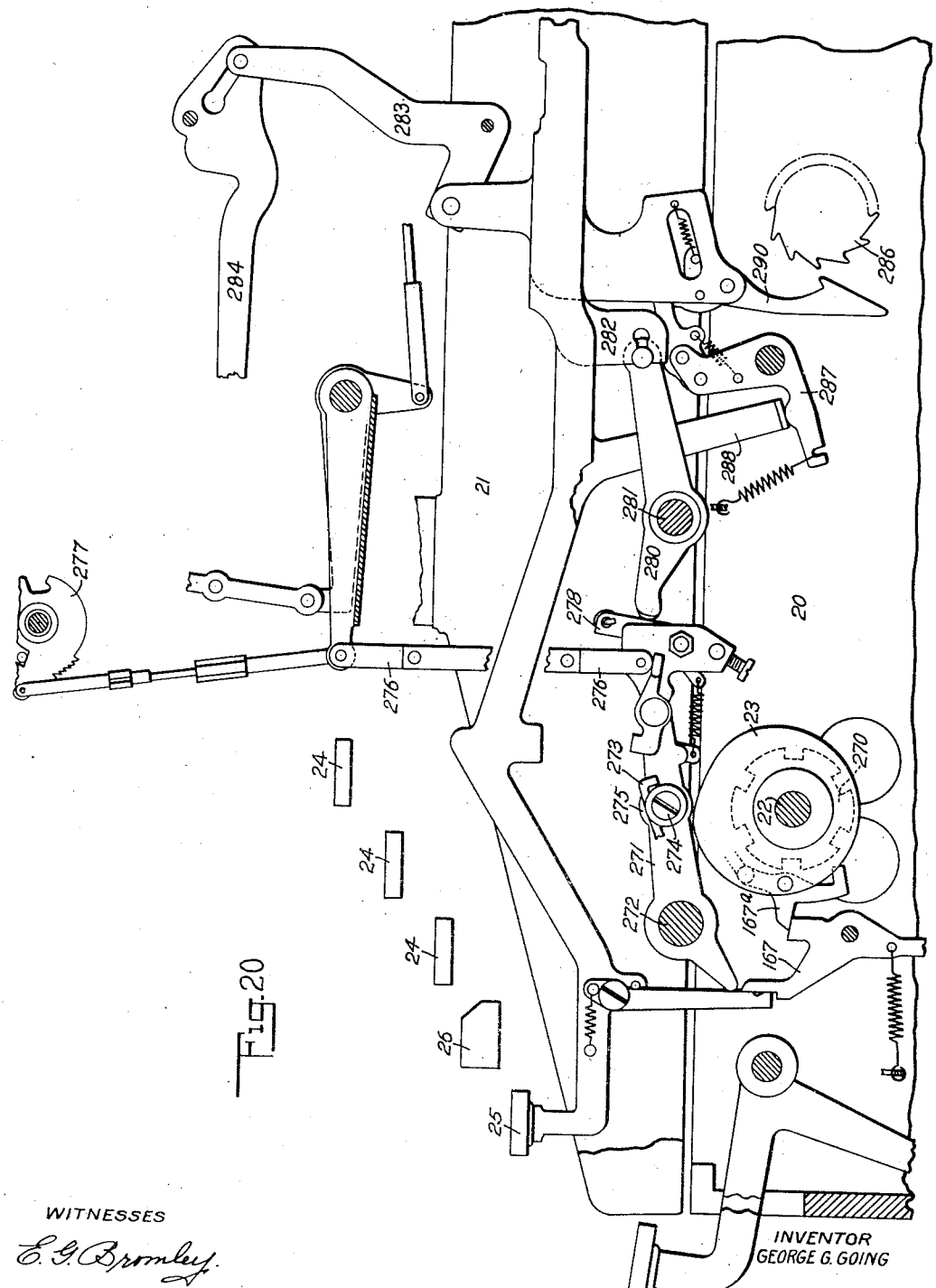

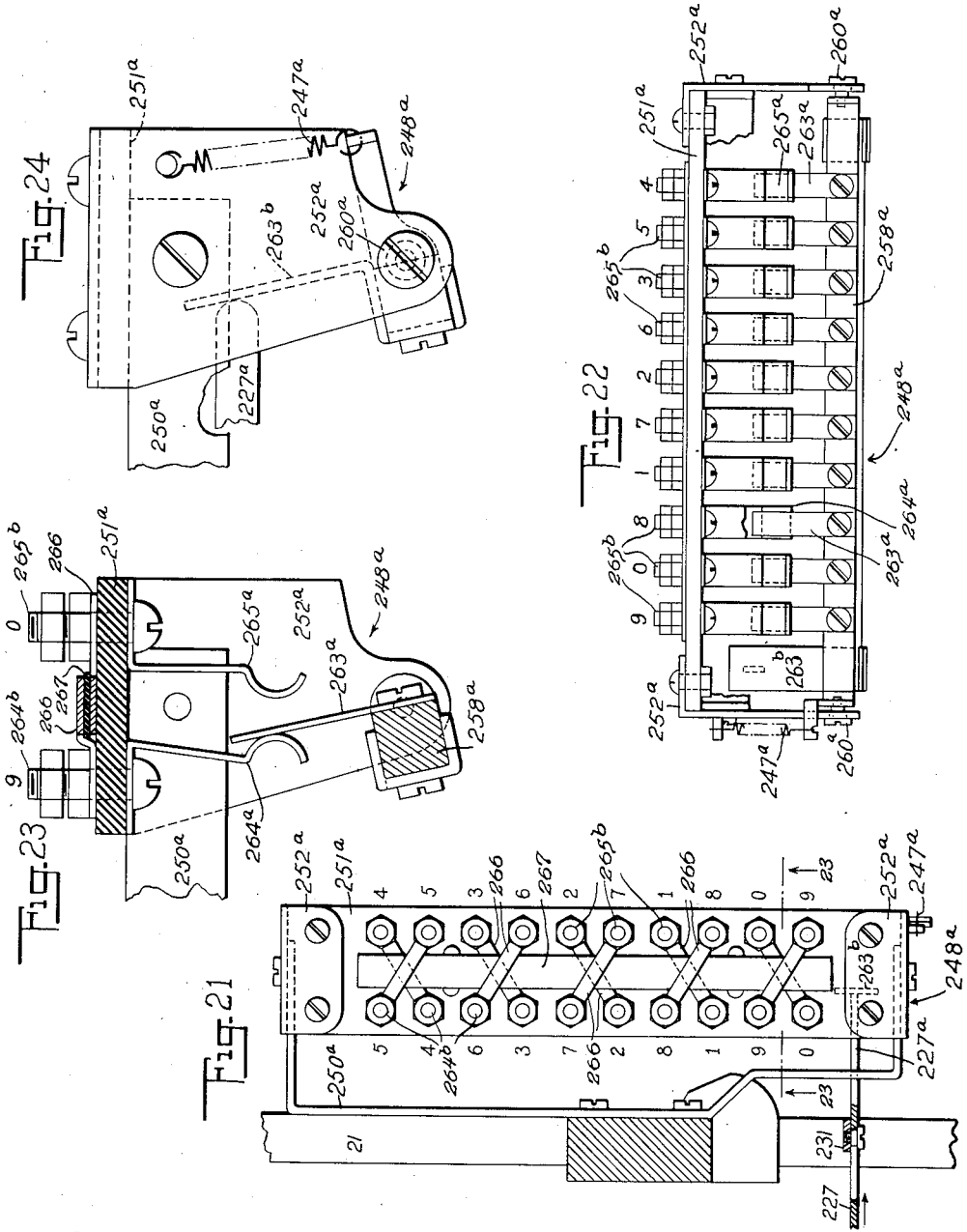

2,172,749

UNITED STATES PATENT OFFICE 2,172,749

COMPUTING AND LIKE MACHINE

George G. Going, Utica, N. Y., assignor to Remington Rand Inc., Buffalo, N. Y., a corporation of Delaware Application August 23, 1934, Serial No. 741,115

15 Claims. (Cl. 235—59)

This invention relates to combined typewriting and computing machines and more particularly to an automatic total printing mechanism for such machines.

One of the primary objects of the present invention is to provide means for automatically printing a total in accordance with and as determined by the total set up in the totalizer, said total being printed digit by digit and at a common printing point.

Another object of my invention is to provide mechanism for the automatic and correct printing of totals, both positive and negative.

A further object is to provide algebraic calculating mechanism including means for inserting the "fugitive 1" into the totalizer when said totalizer registers in a negative amount.

Still another object is to provide a combination of electric and mechanical means for effecting the automatic printing of a total, either positive or negative.

My invention further aims to provide in a combined typewriting and computing machine, an electro-mechanical automatic total printing mechanism, including an algebraic totalizer, actuating gear shift mechanism and a plurality of electric circuits, and means for shifting said actuating gears, changing the electric circuits and inserting a "fugitive 1" into said totalizer when a negative total is to be printed.

A further object of my invention is to provide means of the character specified above which may be readily incorporated in existing machines, such for example as the Remington electrified bookkeeping machine, without changing or materially changing the existing structural features thereof.

To the above and other ends which will hereinafter appear, my invention consists in the features of construction, arrangements of parts and combinations of devices set forth in the following description and particularly pointed out in the appended claims.

In the drawings wherein like reference characters designate corresponding parts in the different views:

Fig. 1 is a fragmentary, side elevational view of the front portion of a combined typewriting and computing machine in which my invention is embodied;

Fig. 2 is an enlarged, fragmentary, vertical fore and aft sectional view of the upper front portion of the machine taken substantially along the line 2—2 of Fig. 3 and looking in the direction of the arrows at said line;

Fig. 3 is an enlarged, fragmentary, front elevational view partly in section of the upper right-hand portion of the machine;

Fig. 4 is an enlarged, vertical force and aft sectional view of the cross totalizer taken substantially on the line 4—4 of Fig. 3 and looking in the direction of the arrows at said line;

Fig. 5 is an enlarged, detail, fragmentary, horizontal sectional view taken along the line 5—5 of Fig. 4 and looking in the direction of the arrows at said line, the view showing the right-hand side plate of the cross totalizer;

Fig. 6 is an enlarged, detail, fragmentary, horizontal sectional view taken along the line 6—6 of Fig. 1 and locking in the direction of the arrows at said line, the view showing the lock for the total key;

Fig. 7 is an enlarged, detail, perspective view of one of the contact selector gears of the cross totalizer, the parts of said gear being shown detached and separated;

Fig. 8 is an enlarged, detail, perspective view of the space key trip-finger and its associated parts, the view showing the parts detached and separated;

Figs. 9 and 10 are enlarged, detail, perspective views of the 'fugitive 1" carrying wheel and the actuating arm therefor;

Fig. 11 is a fragmentary, front elevational view showing the connections of the credit balance key to the credit-balance switch and the "fugitive 1" mechanism;

Fig. 12 is a front elevational view, partly in section, of some of the actuating devices and change gear mechanism of the computing mechanism;

Fig. 13 is a horizontal cross sectional view along the line 13—13 of Fig. 1 and looking in the direction of the arrows at said line, the view showing some of the details of the credit balance switch;

Fig. 14 is a top plan view of the credit balance switch showing the cross wiring connections;

Fig. 15 is a vertical sectional view taken along the line 15—15 of Fig. 14 and looking in the direction of the arrows at said line;

Fig. 16 is a wiring diagram showing the necessary electric circuits used in the machine constructed in accordance with my invention, particularly the circuits between the totalizer contacts, the credit balance switch and the key actuating solenoids;

Figs. 17, 18 and 19 are diagrammatic plan views of one of the contact levers and a trip pawl, showing the three positions these parts assume to close the associated contact during a letter spacing step of the carriage;

Fig. 20 is a fragmentary vertical fore and aft sectional view of the lower portion of the machine showing the power actuating mechanism for the computing and printing mechanisms.

Fig. 21 is a plan view of a modified form of credit balance switch;

Fig. 22 is a side elevational view of the switch shown in Fig. 21;

Fig. 23 is an enlarged vertical cross sectional view taken on the line 23—23 of Fig. 21 and looking in the direction of the arrows at said line; and Fig. 24 is an enlarged side elevational view of the switch shown in Figs. 21 to 23.

I have shown my invention in the present instance embodied in a Remington electrified bookkeeping machine similar to that shown and described in the co-pending application of F. A. Hart Serial No. 510,941, filed Jan. 24, 1931, now Patent No. 2,063,737, dated December 8, 1936, in which the invention may be readily included without materially modifying the existing structural features of such machine. It should be understood however, that the invention is not restricted to its use in said machine but may be included in combined typewriting and computing machines of the same general type, wherever found available.

As is well known, the Remington electrified bookkeeping machine comprises a power actuated Remington typewriter in which is included computing mechanism of the type shown in the patent to J. C. Wahl No. 1,270,471. In the present instance I have shown only so much of the Remington electrified bookkeeping machine as is necessary for a complete understanding of my invention as embodied therein, and for any further details of the typewriter, power actuator, or computing mechanism reference may be made to the above mentioned application and patent.

Before giving a detailed description of the novel mechanism employed to carry out my invention, I will first give a brief outline of the theory on which the computing mechanism operates, with a view of rendering more clear the operation and purposes of the various portions of the mechanism as used in conjunction with the devices of my invention.

As before noted, my invention is shown in the present instance embodied in a Remington electrified bookkeeping machine. In this machine, there is provided a typewriter, the digit keys of which are connected to suitable actuating mechanism to the end that two or more wheels, known as the master wheels, will revolve differential amounts depending on the digit key which is actuated. The motion of the master wheels, due to the operation of the various digit keys, is entered into a vertical and a cross totalizer, each having a step-by-step movement to the left with the typewriter carriage, as will hereinafter appear. Each totalizer contains a group of register wheels and these wheels are connected to the well known Wahl carrying mechanism, to the end that a complete cycle of motion of any register wheel is effective to advance one step the register wheel of next higher order. The cooperation of this mechanism with the devices of the present invention will hereinafter be more fully pointed out.

The Wahl mechanism is provided with various gear shifting or so-called change gear means for reversing the direction of rotation of the master wheels, which rotation is brought about by power actuated means upon the operation of any of the digit keys. This gear shifting may be controlled manually or it may be automatically controlled for the cross totalized by means of cams provided on the vertical totalizers, all as is well known. When the gear shift is in one position, operation of any of the digit keys will result in rotation of the controlled master wheel, or wheels in one direction. When the gear shift is in a second position, operation of any of the digit keys will result in rotation of the controlled master wheel or wheels in the opposite direction. When the gear shift is in the middle, intermediate, or neutral position, operation of any of the numeral keys will not affect the master wheels. These three positions of the gear shifting means will hereinafter be referred to as the adding position, the subtracting position, and the disconnect position. A typical instance of one form of set-up of the Remington bookkeeping machine includes one cross totalizer to be used with either a group of, say, four vertical totalizers, or a group of three vertical totalizers and a dummy totalizer. With this arrangement the machine can be readily adapted for department store bill and charge work in which a ledger sheet and superposed bill sheet are printed simultaneously. The entries may be made on the bill and ledger sheet in four columns of figures, the first being for the "previous balance", the second for "charges", the third for "credits" and the last for the "new balance". The amounts entered into the first two columns are to be added, so the first two vertical totalizers are provided with adding cams to produce an adding in the cross totalizer. The third or "credit" column contains amounts that are to be subtracted in the cross totalizer so the vertical totalizer for this column is provided with a subtracting cam to control the gear shift to produce this operation. In order that the cross-totalizer may be set back to zero during the printing of the total to prepare it for a new line of entries, the vertical totalizer employed in connection with the "new balance" column is provided with a subtracting cam. Thus, as the balance is printed, the amount which shows in the cross totalizer is subtracted out to set it back to zero. It is to be understood that this arrangement of the totalizers is only one of the many set-ups that the Remington bookkeeping machine is adapted for, and though this typical arrangement is to be used during the course of the following description, it is given as a mere illustration.

When writing bills and simultaneously making manifold entries upon a ledger sheet of this sort, the usual procedure is to enter the amounts into the computing mechanism one after another as they are written in their respective columns. The numbers are consequently added or subtracted, as the case may be, into the cross totalizer, so that when the "balance" column is reached the total of the amounts previously entered, less the amount subtracted if there be any will appear behind a sight opening or window in the cross totalizer provided for that purpose. When now it is desired to print the total shown in the cross totalizer, the devices of the present invention are called into play. The carriage, which is provided with the usual decimal tabulator mechanism, is tabulated to the decimal position of the digit of highest order in the total. When it comes to rest at this point a "total" key is depressed which causes the amount shown in the cross totalizer to be printed automatically into the balance column of the ledger sheet digit by digit, all as will hereinafter more clearly appear.

Referring now to the drawings, I shall first describe some of the existing structural features of the Remington electrified bookkeeping machine, and will afterwards describe the devices of the present invention in their combination therewith.

From Figs. 1 and 20 it will be seen that the machine comprises a base frame section 20 carrying most of the power driving mechanism and an upper frame section 21 housing the typewriting and calculating mechanism, said upper section 21 being detachably mounted or hinged upon the base section 20 by any suitable means. The power driving devices comprise two main power driven shafts, one a shaft 22ª for operating the character or alphabet printing type bars, and the other, a shaft 22 carrying cams 23 for controlling the actuation of the computing mechanism and for actuating the numeral printing type bars. These two shafts receive a continuous rotary motion from an electric motor (not shown) mounted at the rear of the machine upon suitable brackets attached to the base frame section 20. Housed in the upper frame section 21 are the usual typewriting mechanisms comprising character printing keys 24, numeral keys 25, space bar 26, the computing mechanism, and some of their associated operating devices as fully described in the copending application of Hart above referred to and as will be hereinafter more fully described.

The usual typewriter carriage 27 which is supported by roller bearings on the upper frame section 21 and is under the control of the usual escapement mechanism, carries a truck 28, (Fig. 2) said truck being loosely secured to the carriage 27 by supporting brackets 29 (Fig. 11) and guided centrally of the machine by the usual rollers 30 on the actuator frame 30ª. Mounted on the truck 28 by the usual dovetail construction is a group of vertical totalizers 31, 31ª, 31ᵇ and 31ᶜ each of which is provided with carrier gears or wheels 32 and gear carrying arms 33. The vertical actuator cooperates with these totalizers, a master wheel 34 giving differential movement to the wheels 32 while a master dog 35 when actuated engages and move one of the gear carrying arms 33.

Somewhat below and to the right of the vertical actuator and likewise secured to the typewriting frame member is the cross actuator which comprises, among its operating parts, a master wheel 36 and a master dog 37 corresponding to the master wheel 34 and master dog 35 in the vertical actuator. The master wheel 36 and master dog 37 are actuated in the usual manner through the usual train of connections (not shown) between the master wheel 34 and the master dog of the vertical totalizer, so that the two master wheels and the two master dogs operate in unison. This construction is essentially the same as that disclosed in the above mentioned Patent to Wahl 1,270,471 and an illustration thereof is not deemed necessary. The master wheel 36 and master dog 37 cooperate with the mechanism of a cross totalizer 38 which is removably secured to a cross truck 40 by the usual latch 41. Rollers 42 mounted on the cross truck 40 engage fixed rails 43 extending between left and right frame plates 44 and 45 (Figs. 3 and 11) to support said truck for reciprocatory movement within its zone of travel, though it is constantly urged toward its normal position at the right by a spring 46.

In order that the cross truck 40 may be given a plurality of reciprocations during a single travel of the vertical totalizer truck 28 in one direction, the number of reciprocations depending on the number of vertical totalizers or dummies used, a so-called pick-up beam is provided on the cross truck which is successively engaged by lugs on the vertical totalizers. Thus, reference to Fig. 11 will disclose that on the right side of each vertical totalizer is an engaging or pick-up lug 47 which is adapted to engage a hook 48 on a pick-up beam 50. A bracket 51 fastened to the cross truck 40 serves to connect said cross truck to the pick-up beam through a pin and slot connection 52, that also affords a pivotal movement of the beam. Said pick-up beam together with a pick-up guard 53 is given a clockwise urge by a spring 54 secured at one end to the bracket 51 and at the other to a pin in the pick-up beam which passes through an opening in the pick-up guard.

As the vertical truck is moved to the left by the typewriter carriage the first vertical totalizer 31 to the left will approach the computing zone and the pick-up lug 47 on said vertical totalizer will engage the hook 48 of the pick-up beam 50. Further movement of the vertical totalizer to the left, after this engagement will cause the pick-up guard 53 which is held in inoperative position by a hook 55 engaging a fixed pin 56, to be released and sprung up to lock the pick-up beam to the vertical totalizer. Thus, as the carriage continues to move to the left carrying the vertical totalizer 31 over its master wheel 34 the cross truck 40 will be given a corresponding movement to carry the cross totalizer 38 over its master wheel 36. This combined movement continues until the vertical totalizer 31 is about to pass out of the computing zone when a pin 57 carried by the pick-up beam 50 engages a fixed cam 58 to force the hook 48 and pick-up guard 53 in a downward direction, thereby releasing the cross truck 40 which springs to its normal position under the tension of its returning spring 46. Having returned to normal position the hook 55 is again engaged by the pin 56 to hold the pick-up guard in inoperative position, leaving the cross truck 40 in readiness to be picked up by engaging the lug on the next vertical totalizer 31ª.

Reverting again to the set-up for department store bill and charge accounts which was referred to above, it was assumed that the vertical truck was to carry either four vertical totalizers, 31, 31ª, 31ᵇ and 31ᶜ or three and a dummy. If the dummy totalizer is used in place of the totalizer 31ᶜ its only functions will be to pick up the cross truck to carry the cross totalizer 38 through the computing zone to receive the amounts entered in the "total" or "balance" column and to set the cross actuator to subtract so that as the total is printed it will clear the cross totalizer. If, however, a regular vertical totalizer is used, aside from performing the functions mentioned above for the dummy totalizer, it may be set to add the cross totals and hence will act as an accumulative or grand totalizers.

As the vertical totalizer 31 enters the computing zone for entering the "previous balance" said vertical totalizer, which is provided with an add cam, picks up the cross truck so that the amount entered digit-by-digit will be added into both totalizers; that is to say in the vertical totalizer 31 and in the cross totalizer 38. After the digit of lowest order has been inserted and the carriage makes its next step to the left, the cross truck is released and it springs back to normal position and is ready to be picked up by the next vertical totalizer 31ᵃ for the entry of the "charge". The above described operation is repeated as the said next vertical totalizer 31ᵃ traverses the computing zone for entry of the amount written in the corresponding column on the bill and ledger sheet, this second amount being added into both totalizers. At this point the cross totalizer contains the sum of the amounts entered into the "previous balance" and the "charge" columns. The vertical totalizer 31ᵇ employed when making an entry in the third or "credit" column, is provided with a subtract cam, so that the amount of "credit" added into the vertical totalizer 31ᵇ for this column will be subtracted from the sum of the "previous balance" and the "charge" which is already contained in the cross-totalizer. After the vertical totalizer 31ᵇ is carried through the computing zone when making an entry in this third column and subtracting the "credit" the cross totalizer again springs back to normal position and is ready to be picked up by the last vertical totalizer 31ᶜ for registering the new "balance", which is the total now present in the cross-totalizer as a result of having passed through the computing zone in making entries in the first three columns.

The mechanism thus far described is all old as is evidenced by the application of Hart, Serial No. 510,941, filed Jan. 24, 1931 and the Wahl Patent No. 1,270,471 above referred to and to which reference may be made for a description of any mechanism these drawings do not show and which Remington bookkeeping machines include, or any mechanism which is particularly referred to and not fully illustrated herein.

I shall now describe the mechanism which is peculiar to my herein described invention, but owing to its rather complex nature I shall first explain each section separately, and subsequently describe the cooperation of the various portions of the machine.

*The cross totalizer*

The cross totalizer 38 is similar in its construction to the algebraic totalizer shown and described in the patent to L. S. McCorn, No. 1,753,711. There are, however, certain modifications that have been made to adapt the mechanism to the uses of the present invention.

Referring to Figs. 4 and 5, it will be seen that the totalizer 38 comprises a right-hand side plate 60, a left-hand side plate 61, and various connecting bars or rods 62 secured at their ends by various means to these frame plates and extending transversely between them.

The register wheels are those of an ordinary Remington or Wahl totalizer and they comprise in each denomination a carrier gear 63 mounted on a transverse shaft 64, an intermediate or idler gear 65 carried by a shaft 66, and a pinion 67 mounted on a third transverse shaft 68, said pinion being rigid with a register wheel or dial 70 on which the amounts are read.

The transfer mechanism is of the intermittent gear type and includes the so-called "Geneva" or stop works gears 71 arranged in two different rows and each mounted on a lever 72. The levers 72 are of two different kinds pivoted on frame rods 73 and 74 respectively, but all at their upper forward ends rest against stop screws 75 and cooperate with a universal bar 76. In all of the respects mentioned and in all other respects except as hereinafter pointed out, the totalizer shown in the drawings contains all the devices usually in Wahl totalizers, and is operated in the well known manner one denomination at a time by the cross actuator master wheel 36 engaging successively the carrying wheels 63 and the master dog 37 engaging successively the transfer levers 72.

On the shaft 66 of the idler gears there is pivoted a lever 77 (Fig. 10) which extends through a slot in the casing and is provided at its outward end with a bifurcated arm 78, the purpose of which will hereinafter be more fully explained. At its inner end the lever 77 is provided with a series of gear teeth 80 which mesh with a series of teeth 81 on an operating wheel or disk 82, shown in Fig. 9 in perspective as viewed from the left. The disk or wheel 82 is pivoted on the shaft 64 of the carrier gears 63 just to the right of the carrier wheel of lowest order.

The wheel 82 has for its purpose to carry to the wheel 63 of lowest order, the so-called "fugitive 1", which must be subtracted or added every time an algebraic totalizer changes from a positive to a negative total, or vice versa. The construction of this wheel is very similar to that of the carrying wheels 63, for like said wheels 63 it is made in the present instance in three planes or stratum. The right-hand strata of a carrying wheel 63 includes the usual thirty teeth, whereas in the wheel 82 there are the teeth 81 meshing with those provided on the lever 77. In the middle plane there are three transfer teeth 83 on each carrying wheel but on the wheel 82 there is only one. The left-hand plane of both wheels consists of a locking disk having a circular perimeter 84, but broken by notches 85 one for each transfer tooth 83 of each of said wheels. It will be noticed that the transfer tooth 83 of wheel 82 is integral with a flange 86 in the plane of the teeth 81. A lever 72 and transfer gear 71 are provided to connect this wheel with the carrying wheel 63 of lowest denominational order in exactly the same way said wheel 63 would be connected with the next one by transfer mechanism, as is well known in totalizers of this kind. It will be perceived that whenever the handle 77 is moved upward from the position shown in Fig. 4, the tooth 83 of wheel 82 is moved from one side to the other of an adjacent tooth on the usual star wheel 87 of the transfer or "Geneva" gear 71, with the result that the wheel 63, and in fact the whole gear train of lowest order will be moved one tooth in subtracting direction. When said handle is then moved downward the wheels turn in an adding direction back to normal position.

In order to limit the extent of the rocking motion of the wheel 82 in both directions, a pin or stud 88 is riveted in the side plate 60 and projects into the plane of the wheel 82. The right-hand stratum of said wheel is cut away so as to leave two lugs 90 and 91 in such position that one of them engages the stud 88 to arrest the wheel when moving in one direction, and the other in the other direction.

In order to retain the parts in one or the other of their two positions two notches 92 and 93 are provided to cooperate properly with a V-shaped nose 94 on a locking lever which is pivoted on the rod 73 and drawn downward by a spring 95, similar to those which control the levers 72. The locking lever having the nose 94 is made similar to those usually employed in the Wahl totalizer to control the register wheel of lowest order, said lever being riveted to the side of a longer lever 96 which is somewhat like the levers 72 except that it does not carry a gear 71 and at its free end cooperates like the levers 72 with a screw stop 75 and the universal bar 76. The construction is such that when the handle 77 is operated the motion of the wheel 82 forces the nose 94 out until the turning of the wheel is nearly completed when said nose is drawn downward by its spring 95 into the notch 92 and completes the motion and retains the parts in position.

As thus far described the totalizer mechanism is similar in its construction to that shown in the McCorn Patent No. 1,753,711 referred to above. In addition to the mechanism described above, however, the cross totalizer 38 of the present invention is provided with a set of contact selector gears 97 mounted on a shaft 98, said gears 97 corresponding in number to the number of carrying wheels 63 and constantly meshing therewith. As shown in Fig. 7 which is a view looking from the left, these contact selector gears are, or may be, made in three separate planes or strata, the right-hand plane comprising a wheel 100 having thirty teeth 101 like those of the carrying wheels 63 with which they mesh, and a hub 102. The middle plane is merely a spacing disk 103 of smaller diameter than wheel 100 and used to separate the toothed wheel 100 from a selector disk 104. Spaced at intervals of 120° around the circumference of the selector disk 104 are three selector fingers 105$^a$, 105$^b$ and 105$^c$, generally referred to hereinafter as the selector fingers, 105, which extend beyond the teeth 101 and have right and left-hand sloping cam faces 106 and 107 respectively, (Figs. 3 and 7). The diameter of the selector disk 104 excluding the fingers 105 corresponds to that of the disk 103 and both disks are provided with openings 108 to fit over the hub 102 of the toothed wheel 100. Thus, the three sections 100, 103 and 104 going to make up the contact selector gears 97 may be fastened together by any suitable means such as rivets 109 counter-sunk into the selector disk 104 to form one complete selector gear. It will be understood, however, that if desired these parts may be made integral or formed from one piece of stock.

The selector gears 97 are mounted on the shaft 98 in such manner that when the dial 70 reads zero, the associated selector fingers 105$^a$, 105$^b$ and 105$^c$ will occupy the positions shown in Figs. 1, 2 and 4. As the carrier wheel 63 rotates in a clockwise direction one tooth for each unit of addition, the contact selector gears will rotate in a counter-clockwise direction, the selector fingers 105$^a$, 105$^b$ and 105$^c$ likewise advancing a step for each unit. When the gear has been advanced ten units the finger 105$^a$ occupying the upper left or zero position will have moved through ten spaces to the lower or vertical position. It will thus be perceived that each selector finger may occupy within 120° ten different radial positions 12° apart and corresponding to the ten digits 1 to 0. That is, when the corresponding numeral dial 70 registers zero, the parts will be in the position shown in Fig. 2 as pointed out above; when the dial 70 advances to show "1", the selector finger 105$^a$ will advance 12° to the "1" position; when the dial advances to show "2", the selector finger 105$^a$ will advance 12° further to occupy the "2" position and so on up to the "9" position. Now as the dial is advanced one more unit past the "9" position to bring it back to "0", contact or selector finger 105$^a$ will move to the lower vertical position and contact finger 105$^b$ will advance into the "0" position previously occupied by finger 105$^a$. It will thus be apparent that for any numeral position of the dial 70 there will be an associated selector finger 105 occupying a corresponding position at the front of the totalizer, and it will be further obvious that the amount any selector finger is displaced from its "0" position will depend on the amount added into its totalizer dial 70. Thus, the positions of the selector fingers at the front of the totalizer will accord with the number present in the totalizer as definitely as the actual numeral dials.

As will hereinafter more clearly appear, the contact selector gears 97, and particularly the selector fingers 105 thereof are used to aid in closing electric circuits to bring about an actuation of the numeral keys corresponding to their radial positions and hence a printing of the total shown in the cross totalizer 38.

In order to properly punctuate the total between the units and tenths places or at any other points that might be desired, and thus make easier the proper reading of the total, a special selecting device 110 (Figs. 3 and 8) may be provided in the totalizer between the register wheels of the units and tenths orders and also at said other points, if desired. In the present instance this selecting device 110 is shown only in the former place and is used to bring about an actuation of the usual space bar 26 of the typewriting machine, though it might equally well be used in conjunction with other punctuation character keys. Said device 110 is mounted on the shaft 98 along with the contact selector gears 97 and, as shown in Fig. 8, comprises a hubbed disk 111, a middle spacing disk 112 like the disk 103, and a selector finger disk 113. All of said disks correspond in diameter to the disk 103, and as in the selector gears 97 the outer two members 112, 113 are mounted on the hubbed portion of the disk 111, the assembly being secured together by any suitable means such as rivets. The selector finger disk 113 is provided with one selector finger 114 which is longer than the fingers 105, but like them it is provided with camming edges 115 and 116. When the device 110 is properly mounted on the shaft 98 the selector finger 114, as shown in Fig. 2, extends in a vertical downward direction, said device 110 being secured against rotation on the shaft 98 by means of a bifurcated arm 117 on the disk 113 which embraces the shaft 66 of the idler gears. By being thus held in its vertical downwardly extending position the finger 114 is always in readiness to perform its function of aiding in the closing of an electric circuit which brings about an actuation of space bar 26, as will hereinafter be fully set forth.

The contact unit

The contact unit as shown in Figs. 1, 2, 3 and 11 and generally designated by the numeral 120, comprises eleven contact-lever supporting-plates 121 radially arranged 12° apart and held together by left and right end plates 122 and 123 respectively and a curved contact lever guide plate 124, secured to said end plates. Each of the end plates 122 and 123 is bent outwardly to form supporting arms 125 which are secured to brackets 126 and the entire contact unit 120 is fastened to the cross actuator rods 127 and 128 through said brackets 126. Slotted connections 130 between the supporting arms 125 and the brackets 126 allow the unit 120 to be adjusted laterally with respect to the cross actuator.

Each of the eleven contact-lever supporting plates 121 is provided with ears 134 at the ends thereof which fit into radially aligned slots in the side plates 122 and 123 to support said contact lever plates in their proper positions 12° apart. Since the contact mechanisms supported on the several plates 121 are all alike, a description of one will suffice.

Referring to Fig. 3 it will be observed that a contact lever 132 is pivotally mounted at 133 to the plate 121 and secured against rotative movement in a clockwise direction by contact of an arm 134 with a stop pin 135 in the plate 121. A trip pawl 136 having a slot 137 through which a pin 138 in the contact lever 132 extends is allowed a slight sliding movement to the left relative to said contact lever 132 through said pin and slot connection 137, 138. A spring 140, stretched between depending ears of the pawl 136 and contact lever 132, has its line of force outside of the pin 138, so that said spring tends to slide said pawl to its right hand position on said pin and also tends to turn the pawl counter-clockwise about said pin, pressing its upper edge against a pin 142, projecting from the lever 132. When the pawl 136 is forced by a contact finger 105 to slide leftward as shown in Fig. 3, a hook 141 at its right hand end moves into engagement with the pin 142 and positively prevents clockwise turning of the pawl about the pivot 138. In this position the pawl 136 and lever 132 are locked together for turning about the pivot 133.

As shown in Fig. 3, the pawl 136 is provided with an arm 143 having a sloping end portion 144 which cooperates with the cam faces 107 and 106 of the selector fingers 105 as the cross totalizer 38 is moved to the left. From the foregoing it will be apparent that as the cross totalizer 38 is picked up and moved to the left by the carriage, the above mentioned contact selector fingers will engage with the arms 143 on the contact lever trip pawls 136 according to the several radial positions of said selector fingers, swinging the contact lever 132 from its normal position shown in Fig. 17 to its operated position shown in Fig. 19.

Referring now to Figs. 17, 18 and 19 there are illustrated three positions which the contact lever and trip pawl assume during a single letter space movement of the totalizer to the left. Fig. 3 shows the parts in the Fig. 18 position. These views also show the relation of the operating parts to the master wheel 36 of the cross actuator during such movement. Immediately before one of the trip pawl arms 143 is about to be engaged by a selector finger 105, the contact lever 132 and its trip pawl are in normal position as depicted in Fig. 17, said pawl being drawn to the right by its spring 140. Upon a release of the carriage for a letter space movement, the finger 105ᵃ engages the arm 143 and moves the pawl to the left to the position shown in Fig. 18. At this point the pawl is in its extreme leftward position with the hook 141 engaging the stud 142, so that further movement of the totalizer to the left will move the contact lever 132 in a counter-clockwise direction about its pivot 133. As the finger 105ᵃ continues to move to the left with the totalizer in approaching the end of its letter space movement, said finger 105ᵃ pushes against the arm 143 with a camming action to cause the counter-clockwise movement of the contact lever together with its trip pawl. Upon downward movement of these parts the selector finger 105ᵃ through its cam face 107 slides onto the inclined edge 144 of the arm 143, so that as the carriage and totalizer come to rest the mechanism occupies the position shown in Fig. 19.

Each contact lever is provided with an outwardly extending arm 145 having a rounded end portion 146 which projects through a slot in the plate 124 and engages an insulating piece 147 on the left end of an electric contact spring member 148, said contact spring tending to hold the contact lever 132 resiliently in its normal rearward position (Fig. 17). As said contact lever is moved in counter-clockwise direction by the action of the selector finger 105ᵃ against the contact trip pawl arm 143, the electric contact spring 148 moves and closes the gap between a contact or circuit closer 150 on the spring 148 and another contact 151 on an outer contact supporting member 149. The contact spring member 148 and the outer contact supporting member 149 are separated at their right-hand ends by suitable insulators 152 and secured to the contact lever guide plate 124 by screws 152ᵃ.

A point which is important to the successful operation of the above described mechanism is the location and movement of the contact lever trip pawls 136. When the arms 143 are in the normal Fig. 17 position, that is, when not engaged by the selector fingers 105, these arms are so located as not to interfere with the movement of the contact selector gear 97 which at the time is geared to the master wheel 36. For example, the dotted showing in Fig. 17 of a selector finger 105 engaging an arm 143 depicts these parts in operative position, that is to say, the contact gear whose dotted finger 105 has depressed the contact lever, is the one whose associated carrier wheel 63 is in mesh with the master wheel and which is about to be rotated to zero. This finger 105 is to the left of and clear of the unengaged arms 143, so that when the selector finger on the engaged pawl is rotated by the master wheel it will not interfere with or be interfered with by the unengaged arms 143. This condition is also shown in Fig. 19. The unengaged pawl arms are always to the right of and entirely clear of the selector finger which will be rotated by the master wheel, and are in position to be picked up at the proper time during the total-printing operation. As pointed out hereinbefore, the whole sensing unit, including the pawls 136, can be adjusted right and left after loosening the screws 125 (Fig. 11) and the correct positions of the fingers 143 to give the best results can thus be arrived at.

Having thus described the mechanism for closing the gap between the contacts 150 and 151, and thus closing the circuits in which said contacts are included after the machine is otherwise conditioned, I shall now describe the electrical connections and mechanisms which effect an actuation of a numeral key or a tripping of the space bar each time such a contact is made in the printing of a total.

As explained above, and as shown in Fig. 2, there are eleven supporting plates 121 in the contact unit 120 and all of these plates carry contacting mechanism like that shown in Figs. 3, 17, 18 and 19, for bringing about a successive closing of their respective contacts in accordance with and as determined by the total set up in the totalizer. Reading in a counter-clockwise direction and beginning at the top of the contact unit 120 the first ten contact-lever supporting plates 121 correspond to the numerals "0" to "9" and all are arranged 12° apart on an arc of a circle, and each is actuated by a selecting finger 105ª, 105ᵇ or 105ᶜ which happens to be set in radial cooperative relation therewith. The eleventh contact lever plate, however, is for the space key and is offset outwardly from the arc of the ten numeral contact plates an amount equal to the difference in length between the selector fingers 105 and the finger 114. Hence the contacting mechanism for the space key will never be actuated by the fingers 105 even though they are radially in line with it, but said mechanism will be operated in exactly the same manner as described above only by the finger 114.

Referring now to the wiring diagram of Fig. 16, it will be observed that the contact 150 of each of the contacting mechanisms for the numerals "0" to "9" is connected by a wire or conductor 153 to a solenoid 154 having a plunger or core 155, the solenoid then being connected to a source of power through a conductor 156. Likewise, the contact 150 for the space key is connected by a conductor 153ª to a solenoid 154ª having a plunger or core 155ª, said solenoid being of greater strength than the solenoids 154. The contacts 151 are all connected to a common conductor which leads to a switch or contact 157 for the "total key" to be hereinafter described, then to a rheostat 158 and on to the source of power, said rheostat being adjusted once for any given source of power. Thus each of the numeral contact switches and the space key switch comprising the contacts 150 and 151 closes a circuit to energize a solenoid, said circuit being interrupted by the total key switch 157 so that no solenoid can be energized unless said total key switch is closed. All of the above mentioned switches, including the total switch 157, may be shunted by a condenser 160, to decrease the arcing as the circuits are opened.

Each of the solenoids 154 for the numeral keys "0" to "9" is mounted with its plunger 155 extending horizontally forward, on a cross bar 161 secured to one of the regular frame members 162 underneath the machine (Fig. 1) by any suitable means such as screws 163. The position of each of these solenoids 154 is such that a link 164, pivotally and detachably secured to the plunger 155, as at 165, may be pivotally connected to an extension 166 on the usual cam latch trip lever 167. In this manner the solenoid plungers for the keys "0" to "9" are attached to the cam latch trip levers of the corresponding numeral keys, so that if a selector finger 105ª, 105ᵇ or 105ᶜ of one of the contact selector gears 97 is set in the "8" position, for example, and the cross totalizer moves to the left to bring about a closing of the contacts 150, 151 for this position, assuming that the total switch 157 is closed, the solenoid for the "8" key will be energized. Energization of the solenoid will cause its plunger to be drawn in, thus drawing the link 164 rearwardly to bring about a tripping of the cam latch or trip pawl 167ª for the "8" key. As is well known this tripping of the cam latch 167ª will effect a computation, either adding or subtracting, of the amount, (eight in the present instance) and a printing of the corresponding numeral.

Referring to Fig. 1 is will be seen that the solenoid 154ª for the space key 26 may be secured in a vertical position by a bracket 168 to the base frame section 20 at either side thereof in a position directly below the usual rearwardly extending key lever 170 of said space key. A link 171 pivotally attached to the plunger 155ª and the lever 170 establishes a connection between these two members, so that when the solenoid is energized the plunger and link 171 will be drawn downwardly to effect an actuation of the space bar and a consequent letter spacing of the carriage. If other methods than the above were used to space the carriage the solenoid 154ª could easily be arranged to bring about an actuation of the proper mechanism.

In the event that it is deemed advisable or desirable to effect an automatic punctuation in all of the columns where entries are made, instead of in the total column alone, it is merely necessary to run the conductor leading from the contact 151 for the space bar directly to the source of power instead of having it lead to the total switch as shown in Fig. 16. Thus each time the gap between the contacts 150 and 151 for the space bar was closed, the associated solenoid 154ª would be energized to effect an actuation of the space bar and such actuation would not depend on the closing of the total switch 157.

*The total key*

Pivotally mounted by means of a screw 172 on the right-hand side of the upper frame section 21, or in any other convenient place adjacent the key board, is a bell crank lever 173, having an arm which extends forward horizontally and carries a total key 174 on the end thereof (Fig. 1). The other arm of the bell crank lever 173 extends downwardly and is connected by means of a link 175 to the lower arm of a second bell crank lever 176 which is pivoted by means of a screw 177 to a bracket 178 attached to the front upright frame member. As shown in Figs. 1 and 6, a lug 180 provided on the upper arm of the bell crank lever 176 is adapted to be engaged by a cam latch 181, said cam latch being formed on one end of a lever 182 which is pivoted at 183 to a bracket 184 on the right front corner post on the upper frame. The construction is such that when the total key 174 is depressed, the link 175 moves upwardly and rearwardly turning the bell crank 176 in a counter-clockwise direction as the parts are shown in Fig. 1 thereby causing the lug 180 to move forward and be caught behind the cam latch 181, thus holding the total key in its depressed position.

As the link 175 moves upwardly and rearwardly when the total key is depressed, a lug 185 provided on said link engages an insulating piece on a spring contact member 186 of the total switch 157 and causes a closing of the contacts of said switch. The total switch is also mounted on the side of the upper frame section 21 by means of a bracket 187 and insulated therefrom by any suitable insulators, such as the fiber pieces 188. The total key is limited in its upward movement by contact of the downwardly extending arm of the bell crank lever 173 with a lug 190, and is resiliently held in its upper position by a spring 191 which extends between a lug 191ª on the frame 21 and the link 175. It will thus be seen that as the total key is depressed it causes a closing of the total switch 157 which remains closed by reason of the engagement of the lug 180 with the cam latch 181.

In order to release the total key from its locked position at the proper time, use is made of some of the actuating parts of the well known cross totalizer interlock mechanism present in computing mechanism of the Wahl type, and which prevents the operation of the computing mechanism when the cross truck is in normal position as is well known. Referring to Figs. 3, 6 and 11 it will be seen that the normal position of the cross truck 40 is determined by the contact of an abutment 192 on said truck, with a lever 193 pivoted in the framework of the cross actuator at 194 and adapted to have its upper end contact with said abutment 192. A slidable member 195 serves to transmit the motion of the lever 193 to another lever 196 and thence to the mechanism (not shown), said lever 193 being given a tendency to turn in a counter-clockwise direction by a spring 197 extending between the slidable member 195 and the left-hand cross actuator frame plate 44.

When the cross truck 40 has been picked up by the pick-up lug of one of the vertical totalizers as the carriage moves to the left carrying the totalizer through a computing zone, the lever 193 moves away from the frame plate 45 under the urge of spring 197 to the position shown in Fig. 3. The left end of the lever 182 is provided with a lug 198 (Fig. 6) which fits into a slot 199 in the sliding member 195 so that when the cross truck is released and the abutment 192 strikes the lever 193 moving it and the sliding member 195 to the right, the lever 182 will be turned in a counter-clockwise direction. Such movement of the lever 182 will release the lug 180 from its engagement with the cam latch 181, allowing the total key to spring back to normal position under the urge of the spring 191 and thus open the total switch 157.

From the foregoing it will be apparent that when the total key 174 is depressed preparatory to the printing of a total, said key will close the gap between the contacts of the total switch 157, keeping said switch closed until the total is printed and the cross truck 40 springs back to normal position. Therefore, as each of the selector fingers 105 or the finger 114 engages a trip pawl arm 143 to bring about a closing of the gap between the contacts 150 and 151, there will be a completed circuit to the source of power to bring about an energization of the associated solenoid 154 or the solenoid 154ᵃ and a consequent computation and printing of the corresponding numeral or tripping of the space key.

*The operation of the machine for debit balances*

I have described in detail the mechanism necessary to carry out my invention for the automatic printing of an ordinary positive total or debit balance. I shall now describe the operation of the same, taking as an example a definite number in the totalizer and following the operation of the machine step-by-step during the automatic printing of such a number.

For the purposes of this description it will be assumed that the vertical totalizers 31, 31ᵃ and 31ᵇ have passed through the computing zone and that the amounts of the "previous balance", "charges" and "credits" have been introduced into the respective vertical totalizers and further, that the cross totalizer 38 has been carried across its master wheel three times so that these amounts have all been entered into said cross totalizer. As hereinbefore explained, the amount now showing in the cross totalizer will be the new balance or "total" which is to be printed and is the result of adding the "charges" to the "previous balance" and subtracting the "credits" therefrom. Assuming that the result of these computations is, for example 32.47 which amount shows on the dials of the cross totalizer, the selector fingers 105 associated with the carrying wheels of the dials for each digit of this total will occupy corresponding radial positions. That is, one of the selector fingers 105 for the tens place will be set at the "3" position so as to be radially in line with the contact lever and trip pawl which control the closing of the circuit for the solenoid which actuates the "3" key lever. Likewise a selector finger for the units place will be set in the "2" position, a tenths place selector finger in the "4" position and a hundredths place selector finger in the "7" position. It is further assumed that the cross totalizer has been released from the vertical totalizer 31ᵇ for the "credit" column and is back in normal position. In other words, everything is in readiness for printing the total automatically digit by digit and at a common printing point.

Now, in order to bring about the automatic printing of the total, the operator glances at the cross totalizer to see the amount that is to be printed. At this observation it is only necessary to note what decimal place the first digit of the total occupies, and in the present instance this is the tens place. The operator then presses the tabulator key corresponding to this decimal place and the typewriter carriage advances to the proper point. As the carriage advances moving the last vertical totalizer 31ᶜ into the computing zone by the tabulation, the pick-up lug 47 of this last vertical totalizer 31ᶜ engages the hook 48 on the pick-up beam 50 and the cross truck 40 is given a corresponding movement to the left, so that when the carriage comes to rest, the carrier wheels for the tens place of both the vertical and cross totalizers are over their respective master wheels. When the cross totalizer 38 is approaching this position the contact pawl arm 143 on the contact plate which is radially in line with the "3" position, is engaged and moved to the position shown in Fig. 19 in a manner hereinbefore described. Thus, when the cross totalizer comes to rest at the tens position the gap between the contacts 150 and 151 of the contact mechanism for the "3" position is closed and the carrier gear 63 for the register wheels in the tens place is over the master wheel.

All that remains now for the operator to do is to depress the total key 174 when the carriage comes to rest after the tabulating operation. As explained above the depression of the total key 174 closes the total switch 157, and since the cross truck 40 is not in normal position the lug 180 will be engaged by the cam latch 181 to hold the total key in its depressed position and hence keep the total switch closed. With the total switch 157 closed and the contact switch for the "3" position of the selector finger closed, the solenoid 154 which controls the actuating mechanism for the "3" key lever will be in a closed circuit with the source of power and will become energized. Energization of this solenoid 154 will draw its associated plunger 155 rearwardly to cause a counter-clockwise movement of the cam latch trip pawl 167. Such movement of the trip pawl for the "3" key lever brings about a tripping of the associated cam latch 167ᵃ.

The action which follows the tripping of any cam latch is fully set forth in the above mentioned application of Hart, Serial No. 510,941, and will be described more fully hereinafter. Suffice it to say for the present that it causes an addition of 3 into the vertical totalizer in the tens place, a subtraction of 3 in the cross-totalizer in the tens place since the vertical totalizer 31ᶜ is provided with a subtracting cam, and an actuation of the "3" type bar which prints this digit on the bill and record sheet and causes the carriage to move one space to the left through the operation of the heel of the actuated type bar on the universal bar which controls the escapement mechanism.

Upon this next step movement of the carriage which moves both totalizers so that their carrying wheels in the units place are over their respective master wheels, the selector finger of the units contact selector gear which is set for the "2" position moves the trip pawl arm 143 in radial alignment therewith to close the contact switch for the numeral "2". Since the total switch is still closed, energization of the solenoid for the "2" key lever will follow immediately and "2" will be added in the vertical totalizer in the units place, subtracted in the cross totalizer in the units place, the numeral "2" will be printed on the bill and record sheet and the carriage will again move one space to the left. Both totalizers, with this space to the left, are moving into the decimal point position and a space in the printing of a fractional number is used to indicate this point.

As the cross totalizer moves into the decimal point position the selector finger 114 which extends vertically downward engages the trip pawl arm 143 radially in line with it which controls the space key through the solenoid 154ᵃ. When the carriage comes to rest the contact mechanism occupies the Fig. 19 position and the circuit for the solenoid 154ᵃ is closed. Energization of this solenoid causes a downward movement of the plunger 155ᵃ and a consequent downward movement of the space bar lever 170 which effects a letter space movement of the carriage and cross truck to the left in the usual manner.

In a manner similar to that explained above for the tens and units digits of the total, the tenths and hundredths digits are subsequently added into the active vertical totalizer, subtracted out of the cross totalizer and printed on the bill and record sheets one at a time. As the carriage moves a space to the left after printing the "7" or last digit of the total, the cross truck is released from the engaged vertical totalizer in a manner explained above, and it springs back to normal position. This causes the release of the lug 180 from the cam latch, a return of the total key to normal position, and a consequent opening of the total switch 157. Thus, the vertical totalizer for the "balance" column shows the new balance or the accumulative balance, the cross totalizer is cleared, and everything is in readiness for another line of computation and an automatic printing of the total which will take place in exactly the same manner. From the foregoing it will be apparent that once the carriage is set in proper denominational position and the total key is depressed, the total is printed automatically.

If, however, at any time the amount of "credit" entered into the cross totalizer is greater than the sum of the "previous balance" and the "charge", the "balance" will become a "credit balance" rather than a debit balance. In algebraic totalizers a credit balance is regarded as a negative balance and is evidenced by a "9" appearing in the highest decimal order of the totalizer instead of a "0". This is due to the fact that when the credit was entered into the cross totalizer the register wheels were rotating in a subtracting direction, and when going past "0" in this direction the "9" will appear. As in the present totalizer 38, which has only one set of dials, the amount shown on the dials when the balance is negative will be what is sometimes called the "arithmetical complement" of the credit balance. However, in this, as in most algebraic machines, the true credit balance is printed, not from this "arithmetical complement" but from the so-called "nines complement" which can be obtained by subtracting "the fugitive 1" from the arithmetical complement; and means for this purpose will presently be described.

It will be apparent that when it is necessary to print a credit balance, and especially to do so automatically, certain additions and changes will have to be made in the ordinary debit balance mechanism in order that it may be done properly. When printing an ordinary debit balance, as explained above, the vertical master wheel is set for add to add the amount to the accumulative total and the cross master wheel is set for subtract to clear the cross totalizer. If now a credit balance or negative total is to be printed the vertical master wheel must be changed to subtract to deduct from the accumulative total, and the cross master wheel changed to add since the amount printed is the complement of the amount shown in the cross totalizer.

Referring to Fig. 12 it will be observed that in the main the ordinary gear shift mechanism shown and described in the Wahl Patent No. 1,270,471 is used in the present construction to accomplish this change of the master wheels. Such mechanism, as is well known, comprises a manually operable shift lever (not shown) which is pivoted at 200 to an arm 201 which controls the movement of a floating lever 202 through a bell crank lever 203 and a connecting link 204. Said floating lever 202 in turn controls the position of actuating or change gears 205 for the master wheel 34 for the vertical totalizers. When the manually operable shift lever is in its uppermost position the master wheel 34 will rotate in adding direction and the parts occupy the relationship shown in Fig. 12, the construction being such that when the arm is moved downward to its lower position the gears 205 will be shifted and the master wheel will rotate in a subtracting direction. With the shift lever in an intermediate or disconnect position the master wheel will not rotate at all.

In a like manner the cross master wheel 36 is controlled by a cam follower 206 which is mounted at the front of the vertical actuator in position to be engaged by the cams 206ᵃ (Fig. 2) on the vertical totalizers. The follower 206 controls the shifting of cross actuating or change gears 207 through a well known train of connections including lever 208, link 210, floating lever 211, link 212, and a lever 213 pivoted at 214 to an actuator frame member. As shown in Fig. 12 the gears 207 are in adding relation but said gears may be shifted like the gears 205 to subtract and disconnect positions by movement of the cam follower 206.

A correction key is used in this type of gear shift mechanism which when depressed reverses the action of both master wheels whether set for addition or subtraction. In case either master wheel is set for non-add or disconnect that setting will be retained if the correction key is depressed. This key is in the nature of a lever of the first order pivoted at 215 and connected by a link 216 to a bell crank 217, the upstanding arm of which is pivoted to a rod 218, said rod being pivoted to both floating levers 202 and 211. The construction is such that a depression of the correction key slides the rod 218 to the right a sufficient distance to bring about the above mentioned shifting of the actuating gears 205 and 207 in a well known manner and as fully set forth in Wahl Patent No. 1,270,471. It can thus be seen that when printing a negative total or credit balance, the correction key could be used to bring about the required shifting of the vertical and cross actuating gears and the resultant change in direction of rotation of the master wheels.

It is not necessary, however, to use this key when printing a negative total for the machine is equipped with a special "credit balance" key 220, (Fig. 11) for this purpose, said credit balance key not only bringing about a shifting of the change gears for reversing the master wheels, but performing some other functions, as will be explained. This key 220 is mounted on one arm of a three-armed lever, the second arm 221 of which acts as a latch lever, and the third arm carries a release key 222. The three armed lever is pivoted at 223 to a crank arm 224 fixed on a rock shaft 225 (Fig. 12) which in the Remington typewriter controls the ribbon shifting mechanism in such a manner that when the credit balance key 220 is depressed, it causes the printing to be in red instead of black. The arm 224 is prolonged beyond the shaft 225 to provide a second crank arm 224ª which is connected by a link 226 (Fig. 12) with the correction key lever so that a depression of the credit balance key shifts the change gears and causes a reversal in the direction of the turning movement of the master wheels. This key when depressed is latched down and remains down until released by striking the key 222 when the parts will be returned to their normal position by means of a spring 222ª. The latching of depressed key 220 is effected by the engagement of pin 221″ on the frame in the rear end of notched slot 221′ in the arm 221. This latching engagement is broken obviously when arm 221 is rocked oppositely by pressure on release key 222 in the well known manner.

Pivotally connected to the arm 221 (Fig. 11) is a horizontal link 227 which is connected to the depending arm of a bell crank 231 by a shoulder screw 228 that is carried by said bell crank and is received in an elongated slot 230 in said link. Superposed on the upper arm of the bell crank 231, and secured thereon by binding screws 232 and 233, is an arm 234 which is made adjustable relative to the crank 231 by the provision of a slot 235 through which the screw 232 extends. The arm 234 and bell crank 231 are pivoted by means of a screw 236 to a bracket 237 which is attached to the fixed left-hand frame plate 44. Pivoted to the arm 234 with the aid of an elongated stud 238 is an upwardly extending link 240 which (Figs. 1 and 2) is connected to the rear arm of a bell crank 241, said bell crank 241 being pivotally mounted on a stud 242 attached to the bracket 237. The forwardly extending arm of the bell crank 241 together with a bail rod 243 and an arm 244 form a bail which extends across the cross actuator, the arm 244 being pivoted at 245 to a bracket 246 which is attached to the right-hand frame plate 45 at the end of the supporting rod 127 and with the aid of a screw 246ª, as shown in Fig. 1.

As best shown in Figs. 2, 3 and 11 it will be seen that the bail rod 243 engages the bifurcated end 78 of the arm 77 which operates the "fugitive 1" mechanism as hereinbefore described.

An upward movement of said bail rod 243 will give a corresponding movement to the arm 77 to subtract "1" from the register wheel of lowest order. The construction of the herein described operating parts associated with the credit balance key is such that when said key is depressed the bail is given an upward movement. A depression of the credit balance key causes a movement to the right of the horizontal link 227 as the parts are shown in Fig. 11. As the left end of the slot 230 engages the screw 228, the crank 231 is turned in a counter-clockwise direction, which through the arm 234 draws the link 240 downward. Such movement of the link 240 effects a clockwise motion (in Fig. 2) of the bell crank 241 and hence an upward movement of the arm 77. It will be recalled that when the credit balance key is depressed it will remain in its depressed position because of the latching of the arm 221 and hence the "fugitive 1" will remain in the totalizer until the key 22 is actuated. Actuation of this key will release the arm 221 and the parts will return to normal position under the tension of the returning spring 222ª, (Fig. 12).

*The credit balance switch*

By referring to Fig. 11 it will be seen that an arm 247 is provided on the horizontal link 227, and through said arm the credit balance key is made to perform still another function when depressed. Said arm 247 is connected to a credit balance switch which is designated as a whole by the reference numeral 248 (Figs. 1, 13, 14 and 15) and is shown in part only in Fig. 11. This switch is secured at the top thereof to a bracket 250 (Fig. 1) attached to an upright frame member at the right side of the machine. Electrically, this switch is inserted between the switches of the contact unit 120 and the solenoids 154, and it has for its purpose a changing of the circuits in such manner that when the cross totalizer shows a negative total the complement of this figure will be printed.

Referring more particularly to Figs. 1, 13, 14 and 15, it will be seen that the credit balance switch 248 comprises an upper stationary circular plate or disk 251 which is secured to the bracket 250 by means of two screw studs 252 and a lower rotary circular plate or disk 253 of smaller diameter than the disk 251, and which is connected to the arm 247 of the link 227 by an arm 254. Both disks are made of Bakelite or other suitable insulating material and are mounted concentrically on a special spindle 255. The upper end portion of this spindle is provided with an unthreaded bearing portion 256 which passes through the upper disk 251, a nut 257 clamping and holding the spindle 255 in place on said disk. The spindle has a body portion 258 on which is loosely mounted a flanged bushing member 260, a nut 261 securing the disk 253 to the bushing. The spindle also has a reduced threaded lower end portion which receives a nut 262, and by which the bushing member 260 together with the rotary disk 253 are supported on the spindle 258.

There are ten terminal posts 263 mounted equal distances apart on the rotary disk 253 and each of these is directly connected by the conductor 153 (Fig. 16) with one of the contacts 150 of the contact unit 120. As shown in Fig. 13 the ten posts 263, are numbered consecutively from "0" to "9" in a counter-clockwise direction, the number of each terminal post indicating that it is connected to the corresponding contact switch. There is a corresponding numbering of the posts diagrammatically indicated in Fig. 16. The terminal post "1" leads to the contact 150 for the "1" position of the selector fingers, the terminal post "2" leads to the contact 150 for the "2" position and so on.

When the rotary disk 253 is in one position each of the terminal posts 263 cooperates with a debit balance spring contact 264 and when the disk is turned a short distance in a counter-clockwise direction (Fig. 13) each terminal post engages a credit balance spring contact 265. Thus there are twenty spring contacts which are mounted on the upper stationary plate 251 and extending downwardly from said upper plate so that a debit balance contact 264 is on one side of each terminal post 263 and a credit balance contact 265 is on the other side. Each of the debit balance contact springs 264 is electrically connected to a solenoid 154, so that the debit balance contact for the "1" terminal post is connected to the solenoid for the "1" numeral key, the debit balance contact for the "2" terminal post is connected to the solenoid for the "2" numeral key, and so on. It is therefore apparent that when the rotary plate is in normal Figure 14 or debit balance position each contact 150 of the contact unit is in circuit with its corresponding solenoid, as hereinbefore pointed out.

When, however, the credit balance key is depressed the arm 247 is moved to the right and the rotary disk 253 is turned in a counter-clockwise direction so that the terminal posts 263 are moved into engagement with the credit balance spring contacts 265 (Fig. 13). As shown in Fig. 14 the contact 265 for the "1" terminal post is electrically connected to the contact 264 for the "8" terminal post; the contact 265 for the "2" terminal post is connected to the contact 264 for the "7" terminal post; the contact 265 for the "3" post is connected to the contact 264 for the "6" post, and so on. In other words, each credit balance spring contact 265 is connected to its "complementary" debit balance spring contact 264; that is "0" to "9", "1" to "8", "2" to "7", "3" to "6", "4" to "5", "5" to "4", "6" to "3", "7" to "2", "8" to "1" and "9" to "0". In this manner when the cross totalizer shows a negative total, and the credit balance key is depressed, if a selector finger 105 is set for "3", for example, it will trip the contact switch in the "3" position, but the solenoid for the complement of "3", which is "6", will be energized and a "6" will be printed.

In the wiring diagram of Fig. 16 the ten terminal posts are shown in normal position engaging the contact spring 264 for debit balance printing. To the left of each post is another spring contact shown in dotted lines and these are the credit balance contacts. It will be observed that there are twenty contact springs on the credit balance switch, two corresponding to each numeral from "0" to "9", and like terminals are electrically connected. Further it will be seen from the wiring diagram and from Fig. 14 that terminal post "1" oscillates between debit balance contact "1" and credit balance contact "8"; post "2" oscillates between debit contact "2" and credit contact "7"; post "3" between contacts "3" and "6"; post "4" between contacts "4" and "5"; post "5" between "5" and "4"; post "6" between "6" and "3"; post "7" between "7" and "2"; post "8" between "8" and "1"; post "9" between "9" and "0"; and post "0" between "0" and "9".

In Figs. 21, 22, 23 and 24 there is shown a modified and somewhat simplified form of credit balance switch which is generally referred to by the reference character 248ª and which, like switch 248, may be secured by a bracket 250ª to an upright frame member at the right side of the machine. In describing this modified form of switch I have used the same reference numerals as were used above in conjunction with the switch 248, with the addition of an exponent thereto to indicate the corresponding parts in the two switches. This credit balance switch 248ª comprises an upper stationary plate 251ª which in the present instance is rectangular in plan and may be made of Bakelite or any other suitable material. Two brackets 252ª extend downwardly from the plate 251ª at the ends thereof and provide bearings for the ends of an oscillatory shaft 258ª of insulating material. As shown, the shaft 258ª is square or angular in cross-section and is journalled in circular bearings in the brackets 252ª by means of screws 260ª. Said shaft is given a tendency to turn in a counter-clockwise direction (Fig. 23) by a contractile spring 247ª but may be moved in the opposite direction, or to the right, by the contact of an extension 227ª of the link 227 with an arm 263ᵇ on the shaft when the credit balance key is depressed.

There are ten terminal contact springs 263ª mounted equal distances apart on the shaft 258ª and distributed throughout the length thereof, which springs correspond to the terminal posts 263 and likewise perform the same function. The terminal springs 263ª on the shaft are adapted to oscillate between a row of ten debit contact leaf springs 264ª and a row of ten credit contact leaf springs 265ª, and in normal position the terminals are held in engagement with the former by the action of the contractile spring 247ª on the shaft. The ten debit contact springs 264ª corresponding to the numerals "0"–"9" are mounted in a row on the left side of the plate 251ª and extending downwardly therefrom. The ten credit balance contacts 265ª are similarly mounted on the right hand side of the plate 251ª, complementary debit and credit contacts being opposite each other. As in the credit balance switch 248, and as shown in Fig. 21, like terminals are connected and the cross connections are suitably insulated. It will be noted that the contact springs 264ª are connected to binding posts 264ᵇ and the contact springs 265ª are connected to binding posts 265ᵇ. Each binding post on one side, as shown in Fig. 21, is connected by a conducting strap 266 to the corresponding binding post on the other side. Thus when the switch is thrown a spring 263ª, which has been connected with "8" binding post on one side, will then be connected to the "1" binding post on the opposite side. A strip 267 of insulation extends along between and separates the straps 266.

From the foregoing, it will be apparent that the credit balance switch 248ª is directly similar in function to the credit balance switch 248. Due to its size, however, it is less cumbersome when attached to the machine, and is of somewhat simpler construction than the switch 248 and for these reasons it might be found to be more desirable.

For the purposes of this description, it will be assumed that the amount of "credit" entered into the cross totalizer 38 is greater than the sum of the "previous balance" and the "charge", so that after the entering of the "credit" the total 99982.41 is shown on the dials of the cross totalizer. The true complement of this figure is 17.59 and is the credit balance that is to be printed.

In printing this total, the operator observes the amount shown in the totalizer, and because of the "9's" appearing therein knows that the result is a negative total and therefore the credit balance key 220 should be depressed. This operation should take place before tabulating so that the "fugitive 1" may be entered into the totalizer before it is engaged with its master wheel. Depression of this key conditions the parts to bring about a change in the direction of rotation of the master wheel for the vertical totalizer to subtract, and the cross master wheel to add, the ribbon is shifted to print in red, the arm 77 is moved upward by the bail rod 243 to subtract "1" from the wheel of lowest order in the cross totalizer and change the dials to read 99982.40, and finally the lower rotary disk 253 of the credit balance switch is turned in a counter-clockwise direction to move the terminal posts 263 into engagement with the credit balance contacts 265, all as hereinbefore described.

With the machine thus properly conditioned by the depression of the credit balance key, the operator observes the amount and tabulates to the first significant decimal position which in this case will be the tens. In any case when a credit balance is shown, the first significant digit occurs after the last of the row of "9's" appearing in the totalizer which shows that the total is a negative one. Upon tabulating to this position the cross totalizer is picked up and both cross and vertical totalizers come to rest with their respective master wheels engaging the carrying gears in the tens place. According to the amount shown in the cross totalizer, a selector finger 105 of the contact selector gears in this position is set in the radial plane for the "8" contact lever, and the gap between the contacts 150 and 151 for this contact lever is closed.

The machine is now in readiness to print the true credit balance of the amount 99982.41 which showed in the cross totalizer prior to the actuation of the credit balance key. Upon depressing the total key the circuit is closed and since the credit balance switch has been rotated the "1" solenoid will be energized rather than the "8" and a "1" will be added in the cross totalizer, subtracted in the vertical and printed on the bill and record sheet. The carriage then moves a step to the left and a "7" is automatically printed in a like manner. Next the carriage is automatically spaced for the decimal point and this is followed by an automatic printing of the "5" and "9", the actual mechanics of these operations being the same as for printing debit balances. When the total has been completely printed it will show as "17.59" in red on the record sheet and this amount will have been subtracted from the accumulative total in the vertical totalizer and added into the cross totalizer to change the dials to read 99999.99. Before beginning the next line of computations the release key 222 is actuated thus shifting the ribbon, the actuating gears, and the credit balance switch back to normal, and also moving the bail 243 and arm 77 back to normal position. Such movement of the arm 77 turns the carrier wheel for the dial of lowest order in the cross totalizer one unit in an adding direction and thus adds "1" to the amount then showing in the cross totalizer, said amount being 99999.99, to bring all of the dials back to zero. It is thus apparent that upon printing the negative total and releasing the credit balance key the machine is in readiness for another line of computations and an automatic printing of their result.

*Operation of type bars and computing mechanism*

In order that the continuity of the foregoing description might not be destroyed and the explanation of the new and important features of my present invention would not be obscured, I have delayed until now the description of the power actuating mechanism for the type bars and computing mechanism shown in Fig. 20 except as they have been hereinbefore generally referred to. This mechanism is all fully described in the co-pending application of Frederick A. Hart, Serial No. 510,941, filed Jan. 24, 1931, but a summary of the operation will be included herein so that I shall have presented a full and complete picture of my invention as it is used in a power actuated combined typewriting and computing machine.

It is to be understood that the numeral printing type bars and the computing mechanism are power actuated, being under the control of the cams 23 mounted on the continuously rotating shaft 22. There are, in the present instance, ten of the cams 23, one for each of the numeral keys 25 for the digits "0" to "9", each being mounted on ball bearings for rotation on the hub of a toothed locking wheel 270.

As shown in Fig. 20 there is provided above each cam an oscillatory actuating arm or lever 271 pivoted to turn loosely on a fixed pivot rod 272, and being given a tendency to turn in a clockwise direction by a heavy spring 273 encircling the rod 272 and bearing against a roller 274 carried by the arm 271. Another roller 275 mounted on the arm 271 bears against the cam 23 to control the operation of the arm 271. The power of each spring 273 is used to actuate the computing mechanism, but this spring is not used to actuate the companion numeral printing type bar, the latter being positively actuated by the companion cam 23 in returning the associated arm to normal position against the force of its spring.

When one of the levers 167 is tripped by depression of its corresponding numeral key or by energization of its associated solenoid 154, it will enable the associated pawl 167ᵃ to engage the toothed wheel 270 and cause its companion cam 23 to make one revolution in a clockwise direction, with the power shaft 22. As the cam turns, the roller follows it under the urge of the spring 273 and the arm reaches its lower limit of motion at about one-half revolution. During this downward movement of the arm 271 a link 276 in operative engagement with the outer end of said arm is given a corresponding movement to actuate one of the usual fans 277 of the computing mechanism and hence to turn the master wheel or wheels a differential amount. A one-way trip lever 278 is pivoted to the reaward end of the lever 271 and this trip lever moves downwardly with the lever 271 and slips past a forwardly extending arm of an actuating lever 280. Said lever 280 is pivoted intermediate its ends on a rod 281 and its rearward end has a pin and slot connection with a companion type bar actuating lever 282 which is pivoted on the usual fulcrum bar at the rear of the machine (not shown). Downward movement of the lever 282 effects a counter-clockwise motion of the usual bell crank sub-lever 283 to swing a numeral printing type bar 284 up to the printing point. The heel of the actuated type bar coacts with the usual universal bar and the carriage is advanced one step.

After a half revolution of the cam 23, with the arm 271 in its downward position and the trip lever 278 below the lever 280, said cam starts to complete its revolution moving the arm 271 upward against the tension of the spring 273. It is during this upward movement of the arm 271 that the trip lever 278 engages the forwardly extending arm of the lever 280 and turns said lever in a clockwise direction. Such movement of the lever 280 effects a downward pull on the sub-lever 282 to swing the type bar 284 up to the printing point. Before the cam 23 completes its revolution trip lever 167 is restored to normal position and is interposed in the path of the pawl 167a thereby releasing it from the locking wheel 270 and arresting the cam 23, all the parts returning to their normal rest positions.

It will thus be apparent that the computing mechanism and numeral printing type bars are power actuated under the control of the cams 23. It will be further obvious that the power actuation of the computing mechanism is effected through the force of the spring 273 on the arm 271 and that such actuation is complete before the type bar is swung to the printing point. It is to be understood that the actuation of the numeral printing type bars is separate and distinct from the alphabet printing type bars, the latter being power actuated from the well known toothed snatch roll 286 as follows. A depression of an alphabet key 24 effects a counter-clockwise movement of a trip lever 287 through a depending arm 288 on the key lever. Such movement of the trip lever causes a pawl 290 to engage the snatch roll 286 and swing an associated alphabet type bar up to the printing point.

From the foregoing description it will be apparent that I have provided a means for the automatic and correct printing of both positive and negative totals as they are shown in the travelling cross totalizer of a combined typewriting and computing machine in which the type bars and computing mechanism are power actuated. Further it will be apparent that once the machine is conditioned to receive the total the operation is entirely automatic.

It will also be seen that the devices of my invention, in the present instance, are in the nature of separate units which may be incorporated in the machine without modifying, or materially modifying the existing structural features thereof.

I have shown a construction in which relative mation between totalizers and master wheel is effected by the travel of the totalizers. It should be understood, however, from certain aspects of my invention I am not confined to any construction of this character, but my invention comprehends in its broader aspects a reversal of this construction in which a travelling master wheel effects the required relative motion.

Various changes may be made in the construction, and certain features thereof may be employed without others, without departing from my invention as it is defined in the accompanying claims.

What I claim as new and desire to secure by Letters Patent is:

1. In a machine of the class described, the combination of printing instrumentalities, a traveling totalizer, and electro-mechanical means for automatically, successively and selectively bringing about an actuation of said printing instrumentalities for printing a total in accordance with and as determined by the setup in said totalizer, said means comprising a plurality of selecting members one for each register wheel in the totalizer, said selecting members being carried by said traveling totalizer, and means including a series of electric circuits controlled by said selecting members and by the movement thereof with the totalizer to bring about a selective operation of the printing instrumentalities.

2. In a key controlled machine of the class described, the combination of a totalizer, printing instrumentalities, means including electric circuits for controlling the printing instrumentalities, and reversible algebraic calculating mechanism including means for introducing into the totalizer a fugitive "1", said controlling means including a member having a single series of electric contacts corresponding in number to the printing instrumentalities, a second member having a double series of electric contacts equal to twice the number of printing instrumentalities, and means acting concomitantly with the reversal of the algebraic calculating mechanism for effecting a relative shifting movement between said members to bring about an engagement between either one or the other of said double series of contacts and the single series of contacts, thereby changing said circuits and causing each of the first series of contacts to select for actuation a different one of said printing instrumentalities.

3. In a machine of the class described, the combination of a traveling totalizer, printing instrumentalities, and electro-mechanical means for automatically, successively and selectively bringing about an operation of said printing instrumentalities to print a total in accordance with and as determined by the total set-up in said totalizer, said means comprising a set of rotative selecting members each having an actuating projection thereon, means for setting said selecting members in accordance with the setting of the register wheels in the totalizer, a plurality of actuating members controlled by said projections during and by the travel of said totalizer and arranged radially of and concentric with said selecting members, and a series of electrical circuit closers controlled by said actuating members.

4. In a combined typewriting and computing machine, the combination of a main carriage, a cross truck carrying a totalizer, means for moving said cross truck in unison with said main carriage and for affording an independent return movement of the cross truck, printing instrumentalities, controlling means for automatically successively and selectively bringing about an operation of said printing instrumentalities to print a total in accordance with and as determined by the total set-up in said totalizer, the construction and arrangement of said controlling means being such that an automatic printing of the total can only be effected during a forward movement of the totalizer through the computing zone, and algebraic calculating mechanism including means for introducing a fugitive 1, said introducing means comprising a special key; and means controlled by said special key for shifting operative connections in said controlling means.

5. In a combined key controlled typewriting and computing machine, the combination of printing instrumentalities, a totalizer including a set of register wheels displaceable from their zero position to represent digits, a plurality of electrical circuits, means for automatically and selectively closing said circuits in accordance with the setting of said register wheels to bring about a selective actuation of said printing instrumentalities for selectively printing said digits successively at a common printing center, and means shiftable when total taking is to be effected to cause the total thus printed to be the arithmetical complement of the number computed on said totalizer, said shiftable means including means for subtracting the fugitive one and means for changing the circuits.

6. In a key-controlled machine of the class described, the combination of a totalizer, means for actuating said totalizer to add and subtract, printing instrumentalities operative to print a number one digit at a time at a common center, means including electric circuits for bringing about actuation of said instrumentalities to print a total as determined by the total set up on said totalizer, and of said actuating means to clear the totalizer, a key, means for introducing the fugitive one into a negative total, means to shift said circuits to print complements, and means to reverse said actuating means, the last three said means being controlled concomitantly by said key.

7. In a machine of the class described, the combination of printing instrumentalities, a traveling totalizer, a total key, means for automatically, successively and selectively actuating said printing instrumentalities to print a total in accordance with and depending on the total registered in said totalizer, the construction being such that the printing of the total is dependent on the actuation of said total key and on the travel of said totalizer through the computing zone, a gear shift mechanism for reversing the operation of said totalizer, means for introducing a fugitive one into said totalizer, means for shifting the connections to cause the totalizer to select complementary printing instrumentalities, and a single key for operating said gear shifting mechanism, said fugitive one means and said connection-shifting means.

8. In a key controlled combined typewriting and computing machine, the combination of printing instrumentalities, a totalizer having a set of register wheels displaceable from a zero position to represent digits, a master wheel for actuating said register wheels, said master wheel and totalizer having relative step-by-step travel from one denomination to another, electric circuits one for each digit, means by which the circuit of the digital value registered on the totalizer wheel engaged by the master wheel is closed automatically, a set of electromagnets in said circuits, one for causing the printing of each digit, and means for changing said circuits to connect each digital contact with the magnet of complemental value whereby either the total indicated on the totalizer or the complement of such total may be printed one digit at a time.

9. In a combined typewriting and computing machine, the combination with a traveling carriage, type bars and power-operated means for operating said type bars, of computing mechanism including a totalizer traveling step-by-step with said carriage, said totalizer having digit selectors one for each denomination, and means whereby each of said selectors by its stepping movement to a particular position brings into action the said power operated means to operate that type bar which prints the digit of the total set up in its denomination of the totalizer.

10. In a combined typewriting and computing machine, the combintion with a traveling carriage and type bars, of computing mechanism including a totalizer traveling step-by-step with said carriage and having in each denomination a digit selector which is set in accordance with a digit of the total registered on said totalizer, an electric circuit for each digital type bar including an electromagnet, means whereby each digit selector by the act of stepping to a certain position closes the one of said circuits appropriate to the digit to which it is set at the time, and means whereby each said electromagnet when energized causes an actuation of its associate type bar to print said digit.

11. In a combined typewriting and computing machine, the combination with a traveling carriage and type bars, of computing mechanism including a totalizer traveling step-by-step with said carriage and having in each denomination a digit selector which is set in accordance with a digit of the total registered on said totalizer, an electric circuit for each digital type bar including an electromagnet, means whereby each digit selector by the act of stepping to a certain position closes the one of said circuits appropriate to the digit to which it is set at the time, and means whereby each said electromagnet when energized causes an actuation of its associate type bar to print said digit, said circuit closing means being so constructed that they close said circuits when said totalizer is traveling in one direction only.

12. The combination of a traveling totalizer having toothed digit selectors for determining the printing of totals, printing instrumentalities for printing a number one digit at a time, electromagnets controlling said printing instrumentalities, and means whereby said toothed selectors close the circuits of said magnets selectively, said means including for each such circuit a member pivoted on a stationary pivot, a second member pivoted to the first and having a finger in the path of those selector teeth that are in a position signifying the digit appropriate to the particular circuit, and means for preventing rotation of said second member on the first in one direction, the construction being such that when the totalizer is traveling toward the left said tooth acting on said finger rocks both said devices together about the first said pivot and closes the circuit and when the totalizer is moving toward the right, said tooth rocks the second said device relative to the first to pemit said tooth to pass.

13. The combination of a traveling totalizer having toothed digit selectors for determining the printing of totals, printing instrumentalities for printing a number one digit at a time, electromagnets controlling said printing instrumentalities, and means whereby said toothed selectors close the circuits of said magnets selectively, said means including for each such circuit a member pivoted on a stationary pivot, a second member pivotally and slidably mounted on the first and having a finger in the path of those selector teeth that are in a position signifying the digit appropriate to the particular circuit, a spring acting on said second member, means for limiting the sliding and pivotal movements of said second member on the first member under the power of said spring, the construction and arrangement being such that when the totalizer is traveling toward the left said teeth acting on said finger first slide said second member bodily on the first and then rock the two said members together about the pivot of the first and when the totalizer is moving toward the right said tooth rocks the second said device relative to the first to permit said tooth to pass, and means whereby the leftward sliding movement of said second member locks it against rotation relative to the first said member.

14. The combination of a traveling totalizer having toothed selectors, typewriter printing means for printing digits one at a time, electric circuits, means controlled by said circuits for controlling said printing means, means whereby the teeth of said selectors close said circuits one at a time to print the total registered on said totalizer, and a special tooth traveling with said totalizer and longer than the selector teeth, a special circuit, and means out of reach of the selector teeth whereby said special tooth closes said special circuit, and mechanism controlled by said special circuit.

15. In a combined typewriting and computing machine, the combination of power operated typewriting mechanism, computing mechanism for adding and subtracting numbers printed by said typewriting mechanism and including a totalizer and gear shift mechanism, means for automatically controlling said typewriting and computing mechanisms to print positive and negative totals registered on said totalizer and to clear the totalizer, said controlling means including electric circuits having a circuit changing device, and means for actuating said gear shift mechanism, for actuating said circuit changing device and for inserting the fugitive one into said totalizer all at one operation preparatory to printing a negative total.

GEORGE G. GOING.